United States Patent
Bhaskar et al.

(10) Patent No.: US 10,599,951 B2
(45) Date of Patent: Mar. 24, 2020

(54) TRAINING A NEURAL NETWORK FOR DEFECT DETECTION IN LOW RESOLUTION IMAGES

(71) Applicant: KLA-Tencor Corporation, Milpitas, CA (US)

(72) Inventors: Kris Bhaskar, San Jose, CA (US); Laurent Karsenti, Rehovot (IL); Brad Ries, San Jose, CA (US); Lena Nicolaides, Milpitas, CA (US); Richard (Seng Wee) Yeoh, Singapore (SG); Stephen Hiebert, Los Altos Hills, CA (US)

(73) Assignee: KLA-Tencor Corp., Milpitas, CA (US)

(*) Notice: Subject to any disclaimer, the term of this patent is extended or adjusted under 35 U.S.C. 154(b) by 0 days.

(21) Appl. No.: 16/364,140

(22) Filed: Mar. 25, 2019

(65) Prior Publication Data
US 2019/0303717 A1    Oct. 3, 2019

Related U.S. Application Data

(60) Provisional application No. 62/649,443, filed on Mar. 28, 2018.

(51) Int. Cl.
*G06K 9/62* (2006.01)

(52) U.S. Cl.
CPC ......... *G06K 9/6256* (2013.01); *G06K 9/6262* (2013.01)

(58) Field of Classification Search
CPC .................. G06K 9/6256; G06K 9/6262
See application file for complete search history.

(56) References Cited

U.S. PATENT DOCUMENTS

| 6,891,627 | B1 | 5/2005 | Levy et al. |
| 6,902,855 | B2 | 6/2005 | Peterson et al. |

(Continued)

FOREIGN PATENT DOCUMENTS

JP    2004-354251    12/2004

OTHER PUBLICATIONS

Goodfellow et al., "Generative Adversarial Nets," arXiv:1406.2661, Jun. 10, 2014, 9 pages.

(Continued)

*Primary Examiner* — Manav Seth
(74) *Attorney, Agent, or Firm* — Ann Marie Mewherter

(57) ABSTRACT

Methods and systems for training a neural network for defect detection in low resolution images are provided. One system includes an inspection tool that includes high and low resolution imaging subsystems and one or more components that include a high resolution neural network and a low resolution neural network. Computer subsystem(s) of the system are configured for generating a training set of defect images. At least one of the defect images is generated synthetically by the high resolution neural network using an image generated by the high resolution imaging subsystem. The computer subsystem(s) are also configured for training the low resolution neural network using the training set of defect images as input. In addition, the computer subsystem(s) are configured for detecting defects on another specimen by inputting the images generated for the other specimen by the low resolution imaging subsystem into the trained low resolution neural network.

31 Claims, 3 Drawing Sheets

(56) References Cited

U.S. PATENT DOCUMENTS

| | | | |
|---|---|---|---|
| 7,409,372 B2* | 8/2008 | Staelin | G06N 3/08 |
| | | | 706/15 |
| 7,418,124 B2 | 8/2008 | Peterson et al. | |
| 7,570,796 B2* | 8/2009 | Zafar | G03F 1/84 |
| | | | 382/144 |
| 7,596,177 B2* | 9/2009 | Imagawa | G06T 3/0087 |
| | | | 375/240.03 |
| 7,676,077 B2 | 3/2010 | Kulkarni et al. | |
| 7,729,529 B2 | 6/2010 | Wu et al. | |
| 7,769,225 B2 | 8/2010 | Kekare et al. | |
| 7,782,452 B2 | 8/2010 | Mehanian et al. | |
| 8,041,106 B2 | 10/2011 | Pak et al. | |
| 8,111,900 B2 | 2/2012 | Wu et al. | |
| 8,126,255 B2 | 2/2012 | Bhaskar et al. | |
| 8,144,943 B2* | 3/2012 | Yashiro | G06K 9/00248 |
| | | | 382/115 |
| 8,213,704 B2 | 7/2012 | Peterson et al. | |
| 8,664,594 B1 | 4/2014 | Jiang et al. | |
| 8,692,204 B2 | 4/2014 | Kojima et al. | |
| 8,698,093 B1 | 4/2014 | Gubbens et al. | |
| 8,716,662 B1* | 5/2014 | MacDonald | H01J 37/222 |
| | | | 250/307 |
| 9,222,895 B2* | 12/2015 | Duffy | G01N 21/9501 |
| 9,721,334 B2* | 8/2017 | Chen | G06K 9/6256 |
| 10,169,852 B1* | 1/2019 | Putman | G06T 5/50 |
| 10,210,613 B2* | 2/2019 | Xu | G06T 7/0012 |
| 10,346,740 B2* | 7/2019 | Zhang | G06K 9/6274 |
| 10,395,356 B2* | 8/2019 | Zhang | G06T 7/0004 |
| 10,430,683 B2* | 10/2019 | Liu | G06K 9/40 |
| 10,460,169 B1* | 10/2019 | Adler | G06F 16/2379 |
| 2003/0086081 A1* | 5/2003 | Lehman | G01N 21/95607 |
| | | | 356/237.1 |
| 2006/0291714 A1* | 12/2006 | Wu | G01N 21/95607 |
| | | | 382/149 |
| 2009/0080759 A1* | 3/2009 | Bhaskar | G06T 7/001 |
| | | | 382/141 |
| 2012/0093392 A1* | 4/2012 | Takagi | G01N 21/9501 |
| | | | 382/149 |
| 2014/0032463 A1* | 1/2014 | Jin | G06N 3/08 |
| | | | 706/25 |
| 2015/0262038 A1 | 9/2015 | Konuru et al. | |
| 2016/0209334 A1 | 7/2016 | Chen et al. | |
| 2016/0377425 A1* | 12/2016 | Gupta | H01J 37/222 |
| | | | 250/307 |
| 2017/0140524 A1 | 5/2017 | Karsenti et al. | |
| 2017/0148226 A1 | 5/2017 | Zhang et al. | |
| 2017/0161884 A1* | 6/2017 | Chen | G06K 9/6256 |
| 2017/0177997 A1* | 6/2017 | Karlinsky | G06N 3/08 |
| 2017/0191945 A1* | 7/2017 | Zhang | G01N 21/8851 |
| 2017/0193400 A1 | 7/2017 | Bhaskar et al. | |
| 2017/0193680 A1 | 7/2017 | Zhang et al. | |
| 2017/0194126 A1 | 7/2017 | Bhaskar et al. | |
| 2017/0200260 A1 | 7/2017 | Bhaskar et al. | |
| 2017/0200264 A1 | 7/2017 | Park et al. | |
| 2017/0200265 A1 | 7/2017 | Bhaskar et al. | |
| 2017/0345140 A1 | 11/2017 | Zhang et al. | |
| 2017/0357895 A1* | 12/2017 | Karlinsky | G06N 3/08 |
| 2017/0365038 A1* | 12/2017 | Denton | G06T 5/00 |
| 2018/0075594 A1 | 3/2018 | Brauer | |
| 2018/0240257 A1* | 8/2018 | Li | G06T 11/60 |
| 2019/0073566 A1 | 3/2019 | Brauer | |
| 2019/0073568 A1* | 3/2019 | He | G06K 9/6267 |

OTHER PUBLICATIONS

Hand et al., "Principles of Data Mining (Adaptive Computation and Machine Learning)," MIT Press, Aug. 1, 2001, 578 pages.

International Search Report and Written Opinion for PCT/US2019/024453 dated Jul. 9, 2019.

Isola et al., "Image-to-Image Translation with Conditional Adversarial Networks," arXiv:1611.07004v2, Nov. 22, 2017, 17 pages.

Jebara, "Discriminative, Generative, and Imitative Learning," MIT Thesis, Feb. 2002, 212 pages.

Jia et al., "A Novel Semi-supervised Deep Learning Framework for Affective State Recognition on EEG Signals," BIBE 14 Proceedings of the 2014 IEEE International Conference on Bioinformatics and Bioengineering, pp. 30-37, Nov. 10-12, 2014, IEEE Computer Society, Washington, DC.

Kingma et al., "Semi-supervised Learning with Deep Generative Models," NIPS 2014, arXiv:1406.5298v2, Oct. 31, 2014, 9 pages.

Krizhevsky et al., "ImageNet Classification with Deep Convolutional Neural Networks," NIPS, Jan. 2012, 9 pages.

Makhzani et al., "Adversarial Autoencoders," arXiv:1511.05644v2, May 25, 2016, 16 pages.

Neal, "Bayesian Learning for Neural Networks," Springer-Verlag New York, Aug. 1996, 204 pages.

Rasmus et al., "Semi-Supervised Learning with Ladder Networks," arXiv1507.02672v2, NIPS 2015, Nov. 24, 2015, 19 pages.

Šet al., "The Variational Bayes Method in Signal Processing," Springer-Verlag Berlin Heidelberg, Dec. 16, 2005, 228 pages.

Sugiyama, "Introduction to Statistical Machine Learning," Morgan Kaufmann, Oct. 9, 2015, 534 pages.

Szegedy et al., "Going Deeper with Convolutions," 2015 IEEE Conference on Computer Vision and Pattern Recognition (CVPR), Jun. 2015, 9 pages.

Torrey et al., "Transfer Learning," Handbook of Research on Machine Learning Applications, published by IGI Global, edited by E. Soria, J. Martin, R. Magdalena, M. Martinez and A. Serrano, Aug. 2009, 22 pages.

Yosinski et al., "How transferable are features in deep neural networks?," Advances in Neural Information Processing Systems 27 (NIPS '14), NIPS Foundation 2014, Nov. 6, 2014, 14 pages.

U.S. Appl. No. 62/681,073, filed Jun. 5, 2018 by Zhang et al.

U.S. Appl. No. 16/357,360, filed Mar. 19, 2019 by Riley et al.

* cited by examiner

TRAINING A NEURAL NETWORK FOR DEFECT DETECTION IN LOW RESOLUTION IMAGES

BACKGROUND OF THE INVENTION

1. Field of the Invention

The present invention generally relates to methods and systems for training a neural network for defect detection in low resolution images.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on wafers to drive higher yield in the manufacturing process and thus higher profits. Inspection has always been an important part of fabricating semiconductor devices. However, as the dimensions of semiconductor devices decrease, inspection becomes even more important to the successful manufacture of acceptable semiconductor devices because smaller defects can cause the devices to fail.

Inspection methods have effectively not changed for more than 20 years. Inspection solutions essentially have the following characteristics: a substantially slow electron beam type system that allows a user to identify and verify problems for physical defects; and separately a substantially fast but coarse optical inspector that covers the entire wafer, but is often limited to a single layer of inspection. These two systems are typically separate. Some inspection systems have a high resolution camera on the same system as a scanning low resolution sensor, but they are not integrated effectively to leverage each other for providing ground truth information.

Conventional lithographic scaling (at 193 nm) has slowed. In addition, extreme ultraviolet (EUV) based scaling while progressing is also happening slowly. Newer applications such as driverless cars, sensors, deep learning (DL) training and inference have resulted in a new focus on computational architectures instead of relying on scaling. As an example, for both high performance computing (HPC) and DL systems, the overall system performance would benefit from a close proximity of memory and central processing unit (CPU) logic. So computer architects are focusing more on chip-to-chip interconnects, wafer scale integration, etc., and re-distribution layers (RDL). These layers are often re-constituted dice, hence the currently used align and subtract defect detection methods will fail as inspection methods for such layers. Currently used segmentation techniques also have become difficult because the amount of nuisance compared to defects of interest (DOIs) is significantly high.

For RDL layers, optical mode selection to suppress nuisance often takes 2 weeks because mode selection is done by manually examining what happens with a high resolution camera with inputs from the user. A typical wafer may only contain 10-20 events that represent DOI whereas the nuisance rate can be in the 100,000 to million range. Therefore, the current methods for selecting optical mode(s) for RDL layer inspection take a prohibitively long time. In addition, the scarcity of DOI, particularly compared to nuisance, available for selecting and setting up the optical modes for RDL layer inspection can further increase the time required for the optical mode selection. Furthermore, the limited number of DOIs available for optical mode selection can result in sub-optimal optical mode parameters being selected for RDL layer inspection, which can diminish the performance capability of such inspection.

Accordingly, it would be advantageous to develop systems and methods for training a neural network for defect detection in low resolution images that do not have one or more of the disadvantages described above.

SUMMARY OF THE INVENTION

The following description of various embodiments is not to be construed in any way as limiting the subject matter of the appended claims.

One embodiment relates to a system configured to train a neural network for defect detection in low resolution images. The system includes an inspection tool that includes a high resolution imaging subsystem and a low resolution imaging subsystem. The high and low resolution imaging subsystems include at least an energy source and a detector. The energy source is configured to generate energy that is directed to a specimen. The detector is configured to detect energy from the specimen and to generate images responsive to the detected energy.

The system also includes one or more computer subsystems configured for acquiring the images of the specimen generated by the high and low resolution imaging subsystems. In addition, the system includes one or more components executed by the one or more computer subsystems. The component(s) include a high resolution neural network and a low resolution neural network.

The one or more computer subsystems are configured for generating a training set of defect images. At least one of the defect images is generated synthetically by the high resolution neural network using at least one of the images generated by the high resolution imaging subsystem. The computer subsystem(s) are further configured for training the low resolution neural network using the training set of defect images as input. The computer subsystem(s) are also configured for detecting defects on another specimen by inputting the images generated for the other specimen by the low resolution imaging subsystem into the trained low resolution neural network. The system may be further configured as described herein.

Another embodiment relates to a computer-implemented method for training a neural network for defect detection in low resolution images. The method includes generating images for a specimen with high and low resolution imaging subsystems of an inspection tool, which are configured as described above. One or more components are executed by one or more computer systems, and the one or more components include a high resolution neural network and a low resolution neural network. The method includes the generating, training, and detecting steps described above. The generating, training, and detecting steps are performed by the one or more computer systems.

Each of the steps of the method described above may be further performed as described further herein. In addition, the embodiment of the method described above may include any other step(s) of any other method(s) described herein. Furthermore, the method described above may be performed by any of the systems described herein.

Another embodiment relates to a non-transitory computer-readable medium storing program instructions executable on one or more computer systems for performing a computer-implemented method for training a neural network for defect detection in low resolution images. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
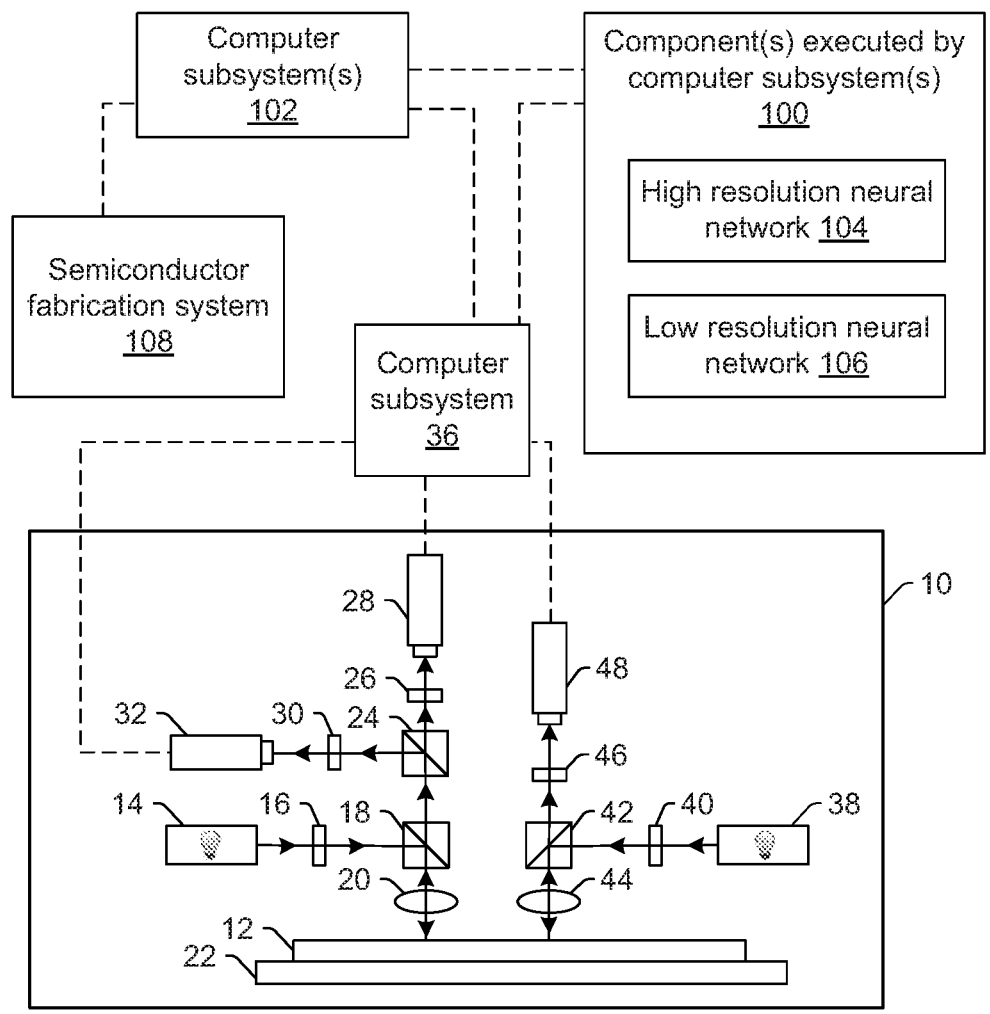
FIGS. 1 and 1a are schematic diagrams illustrating side views of embodiments of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF TILE PREFERRED EMBODIMENTS

The terms "design," "design data," and "design information" as used interchangeably herein generally refer to the physical design (layout) of an IC or other semiconductor device and data derived from the physical design through complex simulation or simple geometric and Boolean operations. In addition, an image of a reticle acquired by a reticle inspection system and/or derivatives thereof can be used as a "proxy" or "proxies" for the design. Such a reticle image or a derivative thereof can serve as a substitute for the design layout in any embodiments described herein that use a design. The design may include any other design data or design data proxies described in commonly owned U.S. Pat. No. 7,570,796 issued on Aug. 4, 2009 to Zafar et al. and U.S. Pat. No. 7,676,077 issued on Mar. 9, 2010 to Kulkarni et al., both of which are incorporated by reference as if fully set forth herein. In addition, the design data can be standard cell library data, integrated layout data, design data for one or more layers, derivatives of the design data, and full or partial chip design data.

In addition, the "design," "design data," and "design information" described herein refers to information and data that is generated by semiconductor device designers in a design process and is therefore available for use in the embodiments described herein well in advance of printing of the design on any physical specimens such as reticles and wafers.

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

One embodiment relates to a system configured to train a neural network for defect detection in low resolution images. One embodiment of such a system is shown in FIG. 1. The system includes one or more computer subsystems (e.g., computer subsystems 36 and 102) and one or more components 100 executed by the one or more computer subsystems. The one or more components include high resolution neural network 104 and low resolution neural network 106, which are configured as described further herein.

The system includes inspection tool 10 that includes a high resolution imaging subsystem and a low resolution imaging subsystem. In some embodiments, the inspection tool is configured as an optical inspection tool. However, the inspection tool may be configured as another type of inspection tool described further herein.

The term "low resolution," as used herein, is generally defined as a resolution at which all of the patterned features on the specimen cannot be resolved. For example, some of the patterned features on the specimen may be resolved at a "low" resolution if their size is large enough to render them resolvable. However, low resolution does not render all patterned features on the specimens described herein resolvable. In this manner, a "low resolution," as that term is used herein, cannot be used to generate information about patterned features on the specimen that is sufficient for applications such as defect review, which may include defect classification and/or verification, and metrology. In addition, a "low resolution imaging subsystem" as that term is used herein generally refers to an imaging subsystem that has a relatively low resolution (e.g., lower than defect review and/or metrology systems) in order to have relatively fast throughput. In this manner, a "low resolution image" may also be commonly referred to as a high throughput or HT image. Different kinds of imaging subsystems may be configured for a low resolution. For example, in order to generate images at higher throughput, the e/p and the number of frames may be lowered thereby resulting in lower quality scanning electron microscope (SEM) images.

The "low resolution" may also be "low resolution" in that it is lower than a "high resolution" described herein. A "high resolution" as that term is used herein can be generally defined as a resolution at which all patterned features of the specimen can be resolved with relatively high accuracy. In this manner, all of the patterned features on the specimen can be resolved at the high resolution regardless of their size. As such, a "high resolution," as that term is used herein, can be used to generate information about patterned features of the specimen that is sufficient for use in applications such as defect review, which may include defect classification and/ or verification, and metrology. In addition, a "high resolution" as that term is used herein refers to a resolution that is generally not used by inspection systems during routine operation, which are configured to sacrifice resolution capability for increased throughput. A "high resolution image" may also be referred to in the art as a "high sensitivity image" which is another term for a "high quality image." Different kinds of imaging subsystems may be configured for a high resolution. For example, to generate high quality images, the e/p, frames, etc., may be increased, which generates good quality SEM images but lowers the throughput considerably. These images are then "high sensitivity" images in that they can be used for high sensitivity defect detection.

In contrast to images and imaging subsystems, neural networks often are not classified or referred to as having any particular "resolution." Instead, the terms high and low resolution neural networks are used herein to identify two different neural networks, one trained and used for high resolution images and another trained and used for low resolution images. In other words, the high resolution neural network may be trained and used to perform one or more functions (e.g., defect detection) using high resolution images generated by a high resolution imaging subsystem as input while the low resolution neural network may be trained and used to perform one or more functions e.g., defect detection) using low resolution images generated by a low resolution imaging subsystem as input. Otherwise, the high and low resolution neural networks may be similarly or differently configured, with their parameter(s) determined and set by the various steps described further herein.

In one embodiment, the specimen is a wafer. The wafer may include any wafer known in the art. Although some embodiments may be described herein with respect to a wafer in particular, it is to be clear that none of the embodiments described herein are limited to wafers.

The high and low resolution imaging subsystems include at least an energy source and a detector. The energy source is configured to generate energy that is directed to a specimen. The detector is configured to detect energy from the specimen and to generate images responsive to the detected energy. Various configurations of the high and low resolution imaging subsystems are described further herein.

In general, the high and low resolution imaging subsystems may share some image forming elements of the inspection tool or none of the image forming elements of the inspection tool. For example, the high and low resolution imaging subsystems may share the same energy source and detector, and one or more parameters of the energy source, detector, and/or other image forming elements of the inspection tool may be altered depending on if the high resolution imaging subsystem or the low resolution imaging subsystem is generating images of the specimen. In another example, the high and low resolution imaging subsystems may share some image forming elements of the inspection tool such as the energy source and may have other non-shared image forming elements such as separate detectors. In a further example, the high and low resolution imaging subsystems may share no common image forming elements. In one such example, the high and low resolution imaging subsystems may each have their own energy source, detector(s), and any other image forming elements that are not used or shared by the other imaging subsystem.

In the embodiment of the system shown in FIG. 1, the high resolution imaging subsystem includes an illumination subsystem configured to direct light to specimen 12. The illumination subsystem includes at least one light source. For example, as shown in FIG. 1, the illumination subsystem includes light source 14. The illumination subsystem is configured to direct, the light to the specimen at one or more angles of incidence, which may include one or more oblique angles and/or one or more normal angles. For example, as shown in FIG. 1, light from light source 14 is directed through optical element 16 to beam splitter 18. Beam splitter 18 directs the light from optical element 16 to lens 20, which focuses the light to specimen 12 at a normal angle of incidence. The angle of incidence may include any suitable angle of incidence, which may vary depending on, for instance, characteristics of the specimen.

The illumination subsystem may be configured to direct the light to the specimen at different angles of incidence at different times. For example, the inspection tool may be configured to alter one or more characteristics of one or more elements of the illumination subsystem such that the light can be directed to the specimen at an angle of incidence that is different than that shown in FIG. 1. In one such example, the inspection tool may be configured to use one or more apertures (not shown) to control the angle(s) at which light is directed from lens 20 to the specimen.

In one embodiment, light source 14 may include a broadband light source. In this manner, the light generated by the light source and directed to the specimen may include broadband light. However, the light source may include any other suitable light source such as a laser, which may include any suitable laser known in the art and may be configured to generate light at any suitable wavelength(s) known in the art. In addition, the laser may be configured to generate light that is monochromatic or nearly-monochromatic. In this manner, the laser may be a narrowband laser. The light source may also include a polychromatic light source that generates light at multiple discrete wavelengths or wavebands.

Light from beam splitter 18 may be focused onto specimen 12 by lens 20. Although lens 20 is shown in FIG. 1 as a single refractive optical element, it is to be understood that, in practice, lens 20 may include a number of refractive and/or reflective optical elements that in combination focus the light to the specimen. The illumination subsystem of the high resolution imaging subsystem may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the inspection tool may be configured to alter one or more of the elements of the illumination subsystem based on the type of illumination to be used for imaging.

Although the high resolution imaging subsystem is described above as including one light source and illumination channel in its illumination subsystem, the illumination subsystem may include more than one illumination channel, one of the illumination channels may include light source 14, optical element 16, and lens 20 as shown in FIG. 1 and another of the illumination channels (not shown) may include similar elements, which may be configured differently or the same, or may include at least a light source and possibly one or more other components such as those described further herein. If the light from different illumination channels is directed to the specimen at the same time, one or more characteristics (e.g., wavelength, polarization, etc.) of the light directed to the specimen by the different illumination channels may be different such that light resulting from illumination of the specimen by the different illumination channels can be discriminated from each other at the detector(s).

In another instance, the illumination subsystem may include only one light source (e.g., source 14 shown in FIG. 1) and light from the light source may be separated into different paths (e.g., based on wavelength, polarization, etc.) by one or more optical elements (not shown) of the illumination subsystem. Light in each of the different paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example, in some instances, optical element 16 may be configured as a spectral filter and the properties of the spectral filter can be changed in a variety of different ways (e.g., by swapping out the spectral filter) such that different wavelengths of light can be directed to the specimen at different times. The illumination subsystem may have any other suitable configuration known in the art for directing the light having different or the same characteristics to the specimen at different or the same angles of incidence sequentially or simultaneously.

The inspection tool may also include a scanning subsystem configured to cause the light to be scanned over the specimen. For example, the inspection tool may include stage 22 on which specimen 12 is disposed during imaging. The scanning subsystem may include any suitable mechanical and/or robotic assembly (that includes stage 22) that can be configured to move the specimen such that the light can be scanned over the specimen. In addition, or alternatively, the inspection tool may be configured such that one or more optical elements of the high resolution imaging subsystem perform some scanning of the light over the specimen. The light may be scanned over the specimen in any suitable fashion such as in a serpentine-like path or in a spiral path.

The high resolution imaging subsystem further includes one or more detection channels. At least one of the one or more detection channels includes a detector configured to detect light from the specimen due to illumination of the specimen by the illumination subsystem and to generate output responsive to the detected light. For example, the high resolution imaging subsystem shown in FIG. 1 includes a detection channel, formed by lens 20, element 26, and detector 28. Although the high resolution imaging subsystem is described herein as including a common lens used for both illumination and collection/detection, the illumination subsystem and the detection channel may include separate lenses (not shown) for focusing in the case of illumination and collection in the case of detection. The detection channel may be configured to collect and detect light at different angles of collection. For example, the angles of light that are collected and detected by the detection channel may be selected and/or altered using one or more apertures (not shown) that are positioned in a path of the tight from the specimen. The light from the specimen that is detected by the detection channel of the high resolution imaging subsystem may include specularly reflected light and/or scattered light. In this manner, the high resolution imaging subsystem shown in FIG. 1 may be configured for dark field (DF) and/or bright field (BF) imaging.

Element 26 may be a spectral filter, an aperture, or any other suitable element or combination of elements that can be used to control the light that is detected by detector 28. Detector 28 may include any suitable detector known in the art such as a photo-multiplier tube (PMT), charge coupled device (CCD), and time delay integration (TDI) camera. The detector may also include a non-imaging detector or imaging detector. If the detector is a non-imaging detector, the detector may be configured to detect certain characteristics of the scattered light such as intensity but may not be configured to detect such characteristics as a function of position within the imaging plane. As such, the output that is generated by the detector may be signals or data, but not image signals or image data. A computer subsystem such as computer subsystem 36 may be configured to generate images of the specimen from the non-imaging output of the detector. However, the detector may be configured as an imaging detector that is configured to generate imaging signals or image data. Therefore, the high resolution imaging subsystem may be configured to generate the images described herein in a number of ways.

The high resolution imaging subsystem may also include another detection channel. For example, light from the specimen that is collected by lens 20 may be directed through beam splitter 18 to beam splitter 24, which may transmit a portion of the light to optical element 26 and reflect another portion of the light to optical element 30. Optical element 30 may be a spectral filter, an aperture, or any other suitable element or combination of elements that can be used to control the light, that is detected by detector 32. Detector 32 may include any of the detectors described above. The different detection channels of the high resolution imaging subsystem may be configured to generate different images of the specimen (e.g., images of the specimen generated with light having different characteristics such as polarization, wavelength, etc. or some combination thereof).

In a different embodiment, the detection channel formed by lens 20, optical element 30, and detector 32 may be park of the low resolution imaging subsystem of the inspection tool. In this case, the low resolution imaging subsystem may include the same illumination subsystem as the high resolution imaging subsystem, which is described in detail above (e.g., the illumination subsystem that includes light source 14, optical element 16, and lens 20). The high and low resolution imaging subsystems may therefore share a common illumination subsystem. The high and low resolution imaging subsystems may however include different detection channels, each of which is configured to detect light from the specimen due to illumination by the shared illumination subsystem. In this manner, the high resolution detection channel may include lens 20, optical element 26, and detector 28, and the low resolution detection channel may include lens 20, optical element 30, and detector 32. In this manner, the high and low resolution detection channels may share a common optical element (lens 20) but also have non-shared optical elements.

The detection channels of the high and low resolution imaging subsystems may be configured to generate high and low resolution specimen images, respectively, even though they share an illumination subsystem. For example, optical elements 26 and 30 may be differently configured apertures and/or spectral filters that control the portions of the light that are detected by detectors 28 and 32, respectively, to thereby control the resolution of the images generated by detectors 28 and 32, respectively. In a different example, detector 28 of the high resolution imaging subsystem may be selected to have a higher resolution than detector 32. The detection channels may be configured in any other suitable way to have different resolution capabilities.

In another embodiment, the high and low resolution imaging subsystems may share all of the same image forming elements. For example, both the high and low resolution imaging subsystems may share the illumination subsystem formed by light source 14, optical element 16, and lens 20. The high and low resolution imaging subsystems may also share the same detection channel or channels (e.g., one formed by lens 20, optical element 26, and detector 28 and/or another formed by lens 20, optical element 30, and detector 32). In such an embodiment, one or more parameters or characteristics of any of these image forming elements may be altered depending on whether high or low resolution images are being generated for the specimen. For example, a numerical aperture (NA) of lens 20 may be altered depending on whether high or low resolution images are being formed of the specimen.

In a further embodiment, the high and low resolution imaging subsystems may not share any image forming elements. For example, the high resolution imaging subsystem may include the image forming elements described above, which may not be shared by the low resolution imaging subsystem. Instead, the low resolution imaging subsystem may include its own illumination and detection subsystems. In one such example, as shown in FIG. 1, the low resolution imaging subsystem may include an illumination subsystem that includes light source 38, optical element 40, and lens 44. Light from light source 38 passes through optical element 40 and is reflected by beam splitter 42 to lens 44, which directs the light to specimen 12. Each of these image forming elements may be configured as described above. The illumination subsystem of the low resolution imaging subsystem may be further configured as described herein. Specimen 12 may be disposed on stage 22, which may be configured as described above to cause scanning of the light over the specimen during imaging. In this manner, even if the high and low resolution imaging subsystems do not share any image forming elements, they may share other elements of the inspection tool such as the stage, scanning subsystem, power source (not shown), housing (not shown), etc.

The low resolution imaging subsystem may also include a detection channel formed by lens 44, optical element 46, and detector 48. Light from the specimen due to illumination by the illumination subsystem may be collected by lens 44 and directed through beam splitter 42, which transmits the light to optical element 46. Light that passes through optical element 46 is then detected by detector 48. Each of these image forming elements may be further configured as described above. The detection channel and/or detection subsystem of the low resolution imaging subsystem may be further configured as described herein.

It is noted that FIG. 1 is provided herein to generally illustrate configurations of high and low resolution imaging subsystems that may be included in the inspection tool or that may generate images that are used by the systems or methods described herein. The configurations of the high and low resolution imaging subsystems described herein may be altered to optimize the performance of the high and low resolution imaging subsystems as is normally performed when designing a commercial inspection tool. In addition, the systems described herein may be implemented using an existing system (e.g., by adding functionality described herein to an existing system) such as the Altair series of tools that are commercially available from KLA, Milpitas, Calif. For some such systems, the embodiments described herein may be provided as optional functionality of the system (e.g., in addition to other functionality of the system). Alternatively, the inspection tool described herein may be designed "from scratch" to provide a completely new inspection tool. The high and low resolution imaging subsystems may be further configured as described in U.S. Pat. No. 7,782,452 issued Aug. 24, 2010 to Mehanian et al., which is incorporated by reference as if fully set forth herein.

The system also includes one or more computer subsystems configured for acquiring the images of the specimen generated by the high and low resolution imaging subsystems. For example, computer subsystem 36 coupled to (or included in) the inspection tool may be coupled to the detectors of the inspection tool in any suitable manner e.g., via one or more transmission media, which may include "wired" and/or "wireless" transmission media) such that the computer subsystem can receive the output or images generated by the detectors for the specimen. Computer subsystem 36 may be configured to perform a number of functions described further herein using the output or images generated by the detectors.

The computer subsystems shown in FIG. 1 (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems. For example, computer subsystem 36 may be coupled to computer subsystem(s) 102 as shown by the dashed line in FIG. 1 by any suitable transmission media, which may include any suitable wired and/or wireless transmission media known in the art. Two or more of such computer subsystems may also be effectively coupled by a shared computer-readable storage medium (not shown).

Although the high and low resolution imaging subsystems are described above as being optical or light-based imaging subsystems, the high and low resolution imaging subsystems may also or alternatively include electron beam imaging subsystem(s) configured to generate electron beam images of the specimen. In one such embodiment, the electron beam imaging subsystem(s) may be configured to direct electrons to or scan electrons over the specimen and to detect electrons from the specimen. In one such embodiment shown in FIG. 1*a*, the electron beam imaging subsystem includes electron column 122 coupled to computer subsystem 124.

Figure 1A:
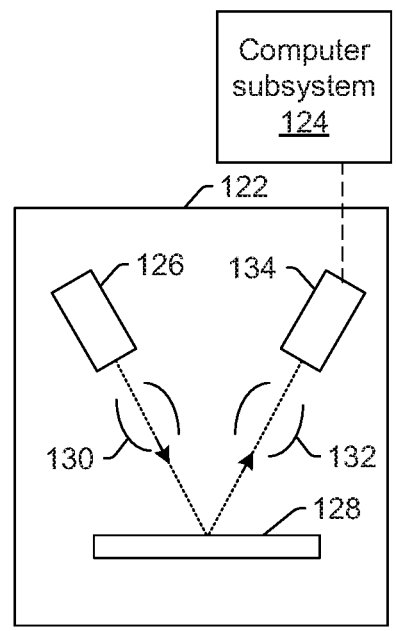

As also shown in FIG. 1*a*, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 1a as being configured such that the electrons are directed to the specimen at an oblique angle of incidence and are returned from the specimen at another oblique angle, it is to be understood that the electron beam may be directed to and detected from the specimen at any suitable angles. In addition, the electron beam imaging subsystem may be configured to use multiple modes to generate images of the specimen as described further herein (e.g., with different illumination angles, collection angles, etc.). The multiple modes of the electron beam imaging subsystem may be different in any image generation parameters. The electron column shown in FIG. 1a may also be configured to function as high and low resolution imaging subsystems in any suitable manner known in the art (e.g., by changing one or more parameters or characteristics of one or more elements included in the electron column so that high or low resolution images can be generated for the specimen).

Computer subsystem 124 may be coupled to detector 134 as described above. The detector may detect electrons returned from the surface of the specimen thereby forming electron beam images of the specimen. The electron beam images may include any suitable electron beam images. Computer subsystem 124 may be configured to perform one or more functions described further herein for the specimen using output generated by detector 134. A system that includes the electron beam imaging subsystem shown in FIG. 1a may be further configured as described herein.

It is noted that FIG. 1a is provided herein to generally illustrate a configuration of an electron beam imaging subsystem that may be included in the embodiments described herein. As with the optical imaging subsystems described above, the electron beam imaging subsystem configuration described herein may be altered to optimize the performance of the imaging subsystem as is normally performed when designing a commercial imaging subsystem. In addition, the systems described herein may be implemented using an existing system (e.g., by adding functionality described herein to an existing system) such as the tools that are commercially available from KLA. For some such systems, the embodiments described herein may be provided as optional functionality of the system (e.g., in addition to other functionality of the system). Alternatively, the system described herein may be designed "from scratch" to provide a completely new system.

Although the imaging subsystems are described above as being light-based or electron beam-based imaging subsystems, the imaging subsystems may be ion beam-based imaging subsystems. Such an imaging subsystem may be configured as shown in FIG. 1a except that the electron beam source may be replaced with any suitable ion beam source known in the art. In addition, the imaging subsystems may be any other suitable ion beam-based imaging subsystem such as those included in commercially available focused ion beam (FIB) systems, helium ion microscopy (HIM) systems, and secondary ion mass spectroscopy (SIMS) systems.

Although the inspection tools are described above as including high and low resolution imaging subsystems that are either optical, electron beam, or charged particle beam based, the high and low resolution imaging subsystems do not necessarily have to use the same type of energy. For example, the high resolution imaging subsystem may be an electron beam type imaging subsystem while the low resolution imaging subsystem may be an optical type imaging subsystem. Imaging subsystems that use different types of energy may be combined into a single inspection tool in any suitable manner known in the art.

As noted above, the imaging subsystems may be configured for directing energy (e.g., light, electrons) to and/or scanning energy over a physical version of the specimen thereby generating actual images for the physical version of the specimen. In this manner, the imaging subsystems may be configured as "actual" imaging systems, rather than "virtual" systems. For example, a storage medium (not shown) and computer subsystem(s) 102 shown in FIG. 1 may be configured as a "virtual" system. Systems and methods configured as "virtual" inspection systems are described in commonly assigned U.S. Pat. No. 8,126,255 issued on Feb. 28, 2012 to Bhaskar et al. and U.S. Pat. No. 9,222,895 issued on Dec. 29, 2015 to Duffy et al., both of which are incorporated by reference as if fully set forth herein. The embodiments described herein may be further configured as described in these patents.

As further noted above, the imaging subsystems may be configured to generate images of the specimen with multiple modes. In general, a "mode" can be defined by the values of parameters of an imaging subsystem used for generating images of a specimen or the output used to generate images of the specimen. Therefore, modes that are different may be different in the values for at least one of the imaging parameters of the imaging subsystem. For example, in an optical imaging subsystem, different modes may use different wavelength(s) of light for illumination. The modes may be different in the illumination wavelength as described further herein (e.g., by using different light sources, different spectral filters, etc.) for different modes. Both the high and low resolution imaging subsystems may be capable of generating output or images for the specimen with different modes.

The high and low resolution neural networks may have a variety of different configurations described further herein. The high and low resolution neural networks may be configured as a network of deep learning (DL) systems. The high resolution neural network may perform one or more functions for a specimen using high resolution images generated for the specimen by the high resolution imaging subsystem. The low resolution neural network may perform one or more functions for a specimen using low resolution images generated for the specimen by the low resolution imaging subsystem.

As described further herein, the high resolution neural network may be used to generate defect images that are used to train the low resolution neural network that is then used for defect detection on a specimen using low resolution images of the specimen. In this manner, the embodiments described herein may be configured as a generalized patch based hybrid inspector using a network of DL systems. For example, the embodiments described herein may be a kind of hybrid inspector that identifies and classifies design and process systematic defects in semiconductor manufacturing processes using a network of DL systems that combine optical and possibly SEM and design patches. The term "systematic defects" is generally defined in the art as defects that are caused by an interaction between a process performed on the specimen and a design formed on the specimen. Therefore, "systematic" defects may be formed at multiple, repeating locations across a specimen.

Each of the high and low resolution neural networks may be a deep neural network with a set of weights that model the world according to the data that it has been fed to train it. Neural networks can be generally defined as a computational approach which is based on a relatively large collection of neural units loosely modeling the way a biological brain solves problems with relatively large clusters of biological neurons connected by axons. Each neural unit is connected with many others, and links can be enforcing or inhibitory in their effect on the activation state of connected neural units. These systems are self-learning and trained rather than explicitly programmed and excel in areas where the solution or feature detection is difficult to express in a traditional computer program.

Neural networks typically consist of multiple layers, and the signal path traverses from front to back. The multiple layers perform a number of algorithms or transformations. In general, the number of layers is not significant and is use case dependent. For practical purposes, a suitable range of layers is from 2 layers to a few tens of layers. Modern neural network projects typically work with a few thousand to a few million neural units and millions of connections. The goal of the neural network is to solve problems in the same way that the human brain would, although several neural networks are much more abstract. The neural networks may have any suitable architecture and/or configuration known in the art. In some embodiments, the neural networks may be configured as a deep convolutional neural network (DCNN) as described in "ImageNet Classification with Deep Convolutional Neural Networks," by Krizhevsky et al., NIPS, 2012, 9 pages, which is incorporated by reference as if fully set forth herein. The embodiments described herein may be further configured as described in this reference.

The neural networks described herein belong to a class of computing commonly referred to as machine learning. Machine learning can be generally defined as a type of artificial intelligence (AI) that provides computers with the ability to learn without being explicitly programmed. Machine learning focuses on the development of computer programs that can teach themselves to grow and change when exposed to new data. In other words, machine learning can be defined as the subfield of computer science that "gives computers the ability to learn without being explicitly programmed." Machine learning explores the study and construction of algorithms that can learn from and make predictions on data—such algorithms overcome following strictly static program instructions by making data driven predictions or decisions, through building a model from sample inputs.

The neural networks described herein may be further configured as described in "Introduction to Statistical Machine Learning," by Sugiyama, Morgan Kaufmann, 2016, 534 pages; "Discriminative, Generative, and Imitative Learning," Jebara, MIT Thesis, 2002, 212 pages; and "Principles of Data Mining (Adaptive Computation and Machine Learning)" Hand et al., MIT Press, 2001, 578 pages; which are incorporated by reference as if fully set forth herein. The embodiments described herein may be further configured as described in these references.

The neural networks described herein may also or alternatively belong to a class of computing commonly referred to as DL. Generally speaking, "DL" (also known as deep structured learning, hierarchical learning or deep machine learning) is a branch of machine learning based on a set of algorithms that attempt to model high level abstractions in data. In a simple case, there may be two sets of neurons: ones that receive an input signal and ones that send an output signal. When the input layer receives an input, it passes on a modified version of the input to the next layer. In a based model, there are many layers between the input and output (and the layers are not made of neurons but it can help to think of it that way), allowing the algorithm to use multiple processing layers, composed of multiple linear and non-linear transformations.

DL is part of a broader family of machine learning methods based on learning representations of data. An observation (e.g., an image) can be represented in many ways such as a vector of intensity values per pixel, or in a more abstract way as a set of edges, regions of particular shape, etc. Some representations are better than others at simplifying the learning task (e.g., face recognition or facial expression recognition). One of the promises of DL is replacing handcrafted features with efficient algorithms for unsupervised or semi-supervised feature learning and hierarchical feature extraction.

Research in this area attempts to make better representations and create models to learn these representations from large-scale unlabeled data. Some of the representations are inspired by advances in neuroscience and are loosely based on interpretation of information processing and communication patterns in a nervous system, such as neural coding which attempts to define a relationship between various stimuli and associated neuronal responses in the brain.

In one embodiment, the high resolution neural network is configured as a semi-supervised DL framework. In another embodiment, the low resolution neural network is configured as a semi-supervised DL framework. For example, a semi-supervised state of the networks can be used in the DL networks described herein. Such a DL framework may be configured for a two-level process using both supervised label information and unsupervised structure information to jointly make decisions on channel selection. For example, label information may be used in feature extraction and unlabeled information may be integrated to regularize the supervised training. In this way, both supervised and unsupervised information may be used during the training process to reduce model variance. A generative model such as a Restricted Boltzmann Machine (RBM) may be used to extract representative features and reduce the data dimensionality, which can greatly diminish the impact of scarcity of labeled information. An initial channel selection procedure utilizing only unsupervised information may remove irrelevant channels with little structure information and reduce data dimensionality. Based on the results from the initial channel selection, a fine channel selection procedure can be used to handle noisy channel problems. Therefore, such a DL framework may be particularly useful for handling information that is very noisy, which may be the case for some of the specimens described further herein. The DL frameworks may be further configured as described in "A Novel Semi-supervised Deep Learning Framework for Affective State Recognition on EEG Signals," by Jia et al., BIBE '14 Proceedings of the 2014 IEEE International Conference on Bioinformatics and Bioengineering, pp. 30-37, Nov. 10-12, 2014, IEEE Computer Society, Washington, D.C., which is incorporated by reference as if fully set forth herein. The embodiments described herein may be further configured as described in this reference.

The embodiments described herein may essentially divide and conquer the noise or nuisance suppression vs. defect of interest (DOI) detection problem. For example, the computer subsystem(s) described herein can perform a kind of iterative training in which training is first performed for nuisance suppression then DOI detection. "Nuisances" (which is sometimes used interchangeably with "nuisance defects") as that term is used herein is generally defined as defects that a user does not care about and/or events that are detected on a specimen but are not really actual defects on the specimen. Nuisances that are not actually defects may be detected as events due to non-defect noise sources on the specimen (e.g., grain in metal lines on the specimen, signals from underlaying layers or materials on the specimen, line edge roughness (LER), relatively small critical dimension (CD) variation in patterned features, thickness variations, etc.) and/or due to marginalities in the inspection subsystem itself or its configuration used for inspection.

The term "DOI" as used herein can be defined as defects that are detected on a specimen and are really actual defects on the specimen. Therefore, the DOIs are of interest to a user because users generally care about how many and what kind of actual defects are on specimens being inspected. In some contexts, the term "DOI" is used to refer to a subset of all of the actual defects on the specimen, which includes only the actual defects that a user cares about. For example, there may be multiple types of DOIs on any given wafer, and one or more of them may be of greater interest to a user than one or more other types. In the context of the embodiments described herein, however, the term "DOIs" is used to refer to any and all real defects on a wafer.

Generally, therefore, the goal of inspection is not to detect nuisances on specimens. Despite substantial efforts to avoid such detection of nuisances, it is practically impossible to eliminate such detection completely. Therefore, it is important to identify which of the detected events are nuisances and which are DOIs such that the information for the different types of defects can be used separately, e.g., the information for the DOIs may be used to diagnose and/or make changes to one or more fabrication processes performed on the specimen, while the information for the nuisances can be ignored, eliminated, or used to diagnose noise on the specimen and/or marginalities in the inspection process or tool.

It is far easier to tackle the nuisance suppression problem be it based on modes (i.e., the image acquisition) or algorithms (i.e., the image processing) if one focuses on minimizing noise. Noise is present in abundance in the low resolution images of the specimens described herein. Grain, for example, is substantially susceptible to producing noise in low NA images whereas it tends to get washed out in high resolution imaging which of course suffers from a much lower throughput compared to tow resolution images. In particular, "grain" as that term is used herein refers to dislocations in the crystalline structure of a metal (such as aluminum or copper). As a result, when grain is present in a metal being imaged, instead of "seeing" a smooth surface, there are numerous discontinuities which at a relatively low NA tend to stand out. In contrast, at a relatively high NA, the discontinuities tend to get washed out (e.g., diminished).

In the various training steps described further herein, images (high or low resolution depending on the neural network being trained) as well as other information can be input, to the neural network being trained. For example, the other information may include information for the design of the specimen (e.g., the design data itself or some other data relevant to the design) and process information, which may include any information for any of the processes performed on the specimen prior to imaging by the inspection tool. Using such additional information for training may be advantageous for a couple of reasons. For example, design information can be useful in reducing prior layer defects (i.e., defects that the user is not interested in for purposes of the current layer inspection). In some such instances, rules can be entered into the neural network via "rules defined by knowledge a priori" or "learned based on the segmentation information provided by design." ("Segmentation" information as that term is used herein is generally defined as the information that is used to inspect different areas on the specimen differently, e.g., by separating images of the specimen into different segments, the inspection of which is determined based on design or other information for the segments.) In addition, re-distribution (RDL) layers in the back end of the semiconductor device fabrication process are somewhat simple (compared to the front end), e.g., they typically include 3 or 4 layers, and therefore "process" knowledge can also be added as an input for these layers both for identifying potential modes as well as inputs for the kinds of defects that are process induced. This information will therefore relate to the nature of the process knowledge as compared to design which is geometrical. The process information may be input as labels or rules or even text that gets merged with the DL network.

The computer subsystem(s) may be configured for training the high resolution neural network. Training the high resolution neural network may be performed in a supervised, semi-supervised, or unsupervised manner. For example, in a supervised training method, one or more images of the specimen may be annotated with labels that indicate noise or noisy areas in the image(s) and quiet (non-noisy) areas in the image(s). The labels may be assigned to the image(s) in any suitable manner (e.g., by a user, using a ground truth method, or using a defect detection method or algorithm known to be capable of separating defects from noise in the high resolution images with relatively high accuracy). The image(s and their labels may be input to the high resolution neural network for the training in which one or more parameters of the high resolution neural network are altered until the output of the high resolution neural network matches the training input.

In an unsupervised training method, unlabeled images may be input to the high resolution neural network for the training and the high resolution neural network may use the images to identify noise in the images. For example, due to the high resolution of the images input to the high resolution neural network, the high resolution images can act as a kind of ground truth information suitable for identifying nuisance areas on the specimen and non-nuisance areas on the specimen and/or by performing a defect detection and/or classification method that separates nuisances from defects, the nuisance and non-nuisance areas on the specimen can be identified. The training may then include altering one or more parameters of the high resolution neural network as described above.

In one embodiment, the images generated by the high resolution imaging subsystem used for training the high resolution neural network include images of the specimen generated by more than one mode of the high resolution imaging subsystem. The number of modes for which images are generated, acquired, and used in this and other steps described herein may vary depending on the various, possible configuration settings of the inspection tool and/or what is simply practical from a time and/or storage space consideration.

In some embodiments, the inspection tool is configured for scanning swaths on the specimen while detecting energy from the specimen, and the one or more computer subsystems are configured for acquiring and storing at least three of the swaths of the images generated by the high resolution imaging subsystem such that the at least three of the swaths are available for use in generating the training set of defect images. The inspection tool may scan the swaths on the specimen as described further herein, and the output or images generated by scanning a swath may be referred to as a swath of output or images. The embodiments described herein are capable of storing an entire row of data (i.e., swaths of images or data that cover entire dies in an entire row on the specimen) for multiple, e.g., 30, modes in both high and low resolution modes. If there is not sufficient storage to store all high resolution patches in the swaths, three swaths (e.g., top, center, and bottom) can be stored. The high resolution images may be scanned for at least three entire swaths and stored on the macro inspector version of the virtual inspector simultaneously as such a system can store the low resolution images described further herein as well.

The images from the multiple modes may be input to the high resolution neural network for training as described further herein. The images from different triodes may he used separately or in combination for training the high resolution neural network. For example, images generated by different modes may be used as multiple channel inputs in the training step. The images from different modes may be used in combination to identify nuisances versus non-nuisances in the images and/or on the specimen. The high resolution neural network parameter(s) may then be altered to suppress detection of such nuisances in the images by the high resolution neural network. In another example, images generated in one or more of the different modes may be used for training the high resolution neural network, which may be performed as described herein, and then the high resolution neural network may be re-trained with the images generated by another or others of the different modes. In this manner, the high resolution neural network may be trained using a kind of transfer learning from one or more modes to another one or more modes.

The one or more computer subsystems are configured for generating a training set of defect images. At least one of the defect images is generated synthetically by the high resolution neural network using at least one of the images generated by the high resolution imaging subsystem. Generating the training set may be performed as described herein. The defect images included in the training set may include various types of defect images described further herein. The at least one defect image may be generated synthetically as described further herein.

The one or more computer subsystems are configured for training the low resolution neural network using the training set of defect images as input. In this manner, the computer subsystem(s) may be configured for performing a type of transfer learning of the information produced by training the high resolution neural network to the low resolution neural network. For example, one advantage of the embodiments described herein is that they provide systems and methods for inspection of semiconductor devices using efficiently trainable neural networks with a limited training set. To this end, a series of transfer learning methods can be used to enable and accelerate the efficient training of neural networks in a principled manner.

Transfer learning can be generally defined as the improvement of learning a new task (or a target task) through the transfer of knowledge from a related task that has already been learned (one or more source tasks). In the embodiments described herein, therefore, training the high resolution neural network may involve learning the one or more source tasks, and training the low resolution neural network may be performed with the results of training the high resolution neural network to thereby transfer the knowledge from the source tasks (the high resolution neural network training) to the target task (the low resolution neural network training). In transfer learning, the agent knows nothing about a target task (or even that there will be a target task) while it is learning a source task. For instance, in the embodiments described herein, the high resolution neural network knows nothing about the low resolution neural network while it is being trained.

The transfer learning described herein may be performed in any suitable manner. For example, in an inductive learning task, the objective is to induce a predictive model from a set of training examples. Transfer in inductive learning works by allowing source-task knowledge to affect the target task's inductive bias. In an inductive transfer method, the target-task inductive bias is chosen or adjusted based on the source-task knowledge. The way this is done varies depending on which inductive learning algorithm is used to learn the source and target tasks.

Inductive transfer can be viewed as not only a way to improve learning in a standard supervised-learning task, but also as a way to offset the difficulties posed by tasks that involve relatively small datasets. That is, if there are relatively small amounts of data or class labels for a task, treating it as a target task and performing inductive transfer from a related source task can lead to more accurate models. These approaches therefore use source-task data to enhance target-task data, despite the fact that the two datasets are assumed to come from different probability distributions.

Transfer learning as described herein can be further performed as described in "Transfer Learning," Torrey et al., Handbook of Research on Machine Learning Applications, published by IGI Global, edited by E. Soria, J. Martin, R. Magdalena, M. Martinez and A. Serrano, 2009, 22 pages, and "How transferable are features in a deep neural network?" Yosinski et al., NIPS 2014, Nov. 6, 2014, 14 pages, which are incorporated by reference as if fully set forth herein. The embodiments described herein may be further configured as described in these references.

In one embodiment, the training set of defect images include images of the specimen generated by more than one mode of the low resolution imaging subsystem. For example, the images used for training the low resolution neural network may include low resolution images generated using 30 or more modes of the low resolution imaging subsystem. The computer subsystem(s) described herein are capable of storing such a high volume of low resolution image data. The multi-mode low resolution images may be generated as described herein and used for training as described herein. The multiple modes of the low resolution imaging subsystem whose images are used in the embodiments described herein may be configured and selected as described further herein.

In some embodiments, the computer subsystem(s) are configured for training the high resolution neural network, and training the high resolution neural network and training the low resolution neural network are performed using a generative adversarial network (GAN) or a variational Bayesian method. For example, a generative high resolution as well as low resolution neural network can be created by looking first at just the nuisance spaces. Such systems can be GANs or variational networks or the like. In particular, the training architecture used by the embodiments described herein is preferably designed to converge to the ground truth (for validation samples) with the minimum number of samples.

In one such embodiment, the one or more components include one or more additional components, the training of the high and/or low resolution neural networks is performed using the one or more additional components, and the one or more additional components include a common mother network, a grand common mother network, an adversarial network, a GAN, a deep adversarial generative network, an adversarial autoencoder, a Bayesian Neural Network, a component configured for a variational Bayesian method, a ladder network, or some combination thereof. For example, the transfer learning methods that may be used in the embodiments described herein include: using a common mother network for back end of line (BEOL) layers; using a grand common mother network for BEOL layers (will likely work on SEM); using an adversarial network to accelerate training; using a Bayesian Neural Network (Variational Bayes), which requires fir fewer layers; and using the concept of the ladder network for training. The embodiments described herein may be configured for accelerating training by "legally amplifying" samples. These methods are also known as semi-supervised (a few examples are available, but the vast majority are not labeled by humans or ground truth).

The computer subsystem(s) can also use methods such as semi-supervised methods that combine Bayesian generative modeling to achieve their results in a minimum number of samples. Examples of such methods are described in U.S. Patent Application Publication No. 2017/0148226 published May 25, 2017 by Zhang et al, and "Semi-supervised Learning with Deep Generative Models," Kingma et al, NIPS 2014, Oct. 31, 2014, pp. 1-9, which are incorporated by reference as if fully set forth herein. The embodiments described herein may be further configured as described in these references. In addition, the computer subsystem(s) may leverage ladder networks where supervised and unsupervised learning are combined in deep neural networks such as the ones proposed in "Semi-Supervised Learning with Ladder Networks," Rasmus et al., NIPS 2015, Nov. 24, 2015, pp. 1-19, which is incorporated by reference as if fully set forth herein. The embodiments described herein may be further configured as described in this reference. The computer subsystem(s) described herein may be further configured to train the low resolution neural network using a deep adversarial generative network of the type described in "Generative Adversarial Nets" Goodfellow et al., Jun. 10, 2014, pp. 1-9, which is incorporated by reference as if fully set forth herein. The embodiments described herein may be further configured as described in this reference. In addition or alternatively, the computer subsystem(s) described herein may be configured to train the low resolution neural network using an adversarial autoencoder (a method that combines a variational autoencoder (VAE) and a deep generative adversarial network (DGAN)) such as that described in "Adversarial Autoencoders," Makhzani et al., arXiv:1511.05644v2, May 25, 2016, 16 pages, which is incorporated by reference as if fully set forth herein. The embodiments described herein may be further configured as described in this reference. In some instances, the computer subsystem(s) may be configured to perform Bayesian Learning as described in "Bayesian Learning for Neural Networks," Neal, Springer-Verlag New York, 1996, 204 pages, which is incorporated by reference as if fully set forth herein. The embodiments described herein may be further configured as described in this reference. The computer subsystem(s) may also be configured to perform the variational Bayes method as described in "The Variational Bayes Method in Signal Processing," Šmídl, Springer-Verlag Berlin Heidelberg, 2006, 228 pages, which is incorporated by reference as if fully set forth herein. The embodiments described herein may be further configured as described in this reference.

In another embodiment, the images generated by the low resolution imaging subsystem and acquired by the one or more computer subsystems include images taken through focus, the one or more computer subsystems are configured for mapping the images taken through focus to the images generated by the high resolution imaging subsystem, and training the low resolution neural network is performed based on the results of training the high resolution neural network and results of the mapping. For example, the computer subsystem(s) can exploit patches of image data taken through focus for the purpose of resolving the many to one mapping representation problem between low resolution (many images can represent) to high resolution (the ground truth). Identifying the high and low resolution images that correspond to the same area on the specimen (and therefore correspond to each other) may therefore be facilitated using the low resolution images taken at multiple focus settings.

Some such embodiments may be performed using volumetric inspection techniques. In general, volumetric inspection includes using an inspection tool to collect intensity data sets at a plurality of focus settings from each of a plurality of xy positions of the sample. A polynomial equation having a plurality of coefficients is extracted for each of the xy position's collected intensity data sets as a function of focus setting. Each of the coefficients' set of values for the plurality of xy positions is represented with a corresponding coefficient image plane. A target set of coefficient image planes and a reference set of coefficient image planes are then analyzed to detect defects on the sample. In this manner, a tuple of volumetric images can be transformed into a Fourier spatial domain for the purpose of separating signal from noise. Volumetric inspection may be further performed as described in U.S. Patent Application Publication No. 2016/0209334 by Chen et al. published on Jul. 21, 2016, which is incorporated by reference as if fully set forth herein. The embodiments described herein may be further configured as described in this publication. In the embodiments described herein, the optical based output of the low resolution imaging subsystem may include volumetric stacks of optical images (e.g., between 3 to 5 z stacks) to enable a solution to the so called "one-to-many mapping" problem in optical space. The optical system tuple concept can also be extended to include other optical modes besides the z focus images such as different wavelengths and apertures.

It is believed that a DL approach is superior particularly when combined with an optical volumetric stack of z images. For example, the neural network(s) described herein may have a one-to-many transformation problem. In particular, since virtually all optical systems can be modeled as a thin film stack, variations in the film stack along with variations in the wafer topography may cause a one-to-many mapping when going from high resolution imaging to low resolution imaging. All these variations could be learned, but they may also be a source of noise particularly if they occur locally (e.g., due to local color variations). There are a myriad of hand crafted algorithms to cope with these but none of them are totally effective. The volumetric stack of images can help to mitigate the one-to-many mapping problem and to shore up the "signal." For example, the volumetric information captures "phase" information in addition to "intensity" information from the optical images. In contrast, normal optical based inspection only works from "intensity," which is a cause of ambiguity (the "many" in the "one-to-many" mapping). Therefore, the embodiments described herein can exploit patches of image data taken through focus for the purpose of resolving the many-to-one mapping representation problem between low resolution (many images can represent) to high resolution (the ground truth).

It is quite easy to design a system that catches no defects—quite useless too. Fortunately, for the applications described herein, the nature of the key defects in the layers of the specimen being inspected, e.g., an RDL: layer, are well understood. For example, the known DOIs may include opens, shorts, protrusions, and intrusions.

The training set of defect images may include a variety of information for the known DOIs including high resolution images. For example, the training set may include design information (design patches, computer-aided design (CAD) design data, rendered design data, design context information) for each of the known DOIs. The training set may also include other images such as test images, reference images, difference images, segmentation images, etc. for each of the known DOIs. The training set may also include defect information such as defect classification, size, shape, location, etc. In general, the training set may include any information related to the known DOIs that may be input to the high and low resolution neural network during training and/or runtime.

The known DOIs may include a number of different kinds of DOIs described herein from a number of different sources. In general, the known DOIs in the training set may include known DOIs identified by one or more methods or systems. The known DOIs preferably include (when possible) two or more examples of each type of known DOI (e.g., two or more open examples, two or more short examples, etc.).

The training may include inputting the information for the training set of known DOIs into the high and/or low resolution neural network and altering one or more parameters of the high and/or low resolution neural network until the output produced by the high and/or low resolution neural network for the known DOIs matches (or substantially matches) the information for the known DOIs in the training set. Training the high and/or low resolution neural network may also include a kind of re-training, which may include transferring all weights of some layers (e.g., convolutional layers) of the high and/or low resolution neural network and fine tuning weights of other layers (e.g., fully connected layers) of the high and/or low resolution neural network. Training may, however, include altering any one or more trainable parameters of the neural network. For example, the one or more parameters of the neural networks that are trained by the embodiments described herein may include one or more weights for any layer of the neural networks that has trainable weights. In one such example, the weights may include weights for convolution layers but not pooling layers.

In some embodiments, the training set of defect images includes high resolution images that represent images of the specimen generated by more than one mode of the high resolution imaging subsystem. The more than one mode of the high resolution imaging subsystem corresponding to the images in the training set may include any of the modes described herein. The high resolution images in the training set may represent images of the specimen generated by all or only some (two or more) of the modes that the high resolution is capable of using.

In some instances, as described herein, at least some of images in the training set may be generated in a manner that does not necessarily involve the high resolution imaging subsystem. For example, one or more of the high resolution images in the training set may represent images of the known DOIs generated by more than one mode thereby corresponding to different high resolution images generated by different modes of the high resolution imaging subsystem. Different high resolution images may be simulated for different modes of the high resolution imaging subsystem thereby representing the high resolution images that would be generated by the different modes of the high resolution imaging subsystem for the known DOIs. In this manner, the high resolution images may include images that simulate, represent, or approximate images that would be generated by the high resolution imaging subsystem if a known DOI on a specimen were imaged by the high resolution imaging subsystem.

In one embodiment, the training set of defect images includes one or more images of one or more programmed defects on the specimen, the one or more computer subsystems are configured for generating the one or more programmed defects by altering a design for the specimen to create the one or more programmed defects in the design, and the altered design is printed on the specimen to create the one or more programmed defects on the specimen. "Programmed" defects as that term is used herein can be generally defined as one or more defects purposefully caused on a specimen by manipulation of the design information for the specimen.

In contrast to methods that involve creating synthetic but realistic images for training, printing a specimen with a design altered to include programmed defect(s) allows for the true entitlement capability of the system to be used because actual DOI (programmed defects printed on the specimen) are available in abundance. For users willing to create test wafers, reticles with defects programmed into the design by the computer subsystem(s) can be used to print the altered design on the test wafers much like standard direct step on wafer (DSW) wafers leveraged for decades in the front end of line (FEOL). Producing such test wafers using at least some of the same process steps used to produce product wafers will enable relatively high volumes of actual DOI images, which have the same optical properties as expected in real examples on product, to be collected for use in training a neural network to separate DOIs from nuisance.

Generating the programmed defect(s) by altering the design for the specimen may be performed based on information about the known DOIs such as type, dimensions, locations, shape, etc., which may come from any appropriate source (e.g., prior design or process knowledge and/or defect detection results). Altering the design for the specimen may be performed using an electron design automation (EDA)

tool. In this manner, the embodiments described herein may have an added dimension of leveraging programmed design data generated with EDA CAD tools. The EDA tool may include any suitable commercially available EDA tool. In addition, the CAD work can be automated with a programmable/graphical EDA editor, which may include any suitable EDA software, hardware, system, or method. In some such embodiments, one or more of the computer subsystems described herein (e.g., computer subsystem(s) 102) may be configured as an EDA tool or may be a computer subsystem included in an EDA tool.

In one such embodiment, altering the design for the specimen to create the one or more programmed defects in the design may be performed using an inception module configured for altering the design to create the programmed defects in the design. For example, the neural networks described herein may be trained by a defect hallucination system such as those suggested by GoogLeNet inception for natural scene images. A traditional neural network that is pre-trained on defects can then play these backwards to create new defect types on other geometry structures. Examples of systems and methods for performing GoogLeNet inception can be found in "Going Deeper with Convolutions," Szegedy et al., 2015 IEEE Conference on Computer Vision and Pattern Recognition (CVPR), June 2015, 9 pages, which is incorporated by reference as if fully set forth herein. The embodiments described herein may be further configured as described in this reference.

The altered design may be printed on the specimen using a semiconductor fabrication subsystem configured to perform one or more fabrication processes on the specimen. The one or more fabrication processes may include making reticle(s) or mask(s) with the altered design and then processing wafers with those reticle(s) or mask(s). The one or more fabrication processes may include any suitable such processes known in the art. As shown in FIG. 1, the system may include semiconductor fabrication system 108, which may be coupled to computer subsystem(s) 102 and/or any other elements of the system described herein. The semiconductor fabrication system may include any semiconductor fabrication tool and/or chamber known in the art such as a lithography track, an etch chamber, a chemical mechanical polishing (CMP) tool, a deposition chamber, a stripping or cleaning chamber, and the like. Examples of suitable semiconductor fabrication tools that may be included in the embodiments described herein are described in U.S. Pat. No. 6,891,627 to Levy et al. issued on May 10, 2005, which is incorporated by reference as if hilly set forth herein. The embodiments described herein may be further configured as described in this patent.

After the specimen has been printed with the altered design, the locations of the programmed defect(s) on the specimen can be imaged using the high and low resolution imaging subsystems. The high and low resolution images of the programmed defect(s) can then be used in the training steps described herein. In this manner, the embodiments may use a hybrid approach involving empirical and programmed methods in combination, that includes generation of programmed layout defects as described above in design space and determining the empirical impact of those programmed layout defects on wafers by making masks with the modified design and processing wafers with those masks. In this manner, the neural networks can be trained using actual images of programmed defects.

Figure 2:
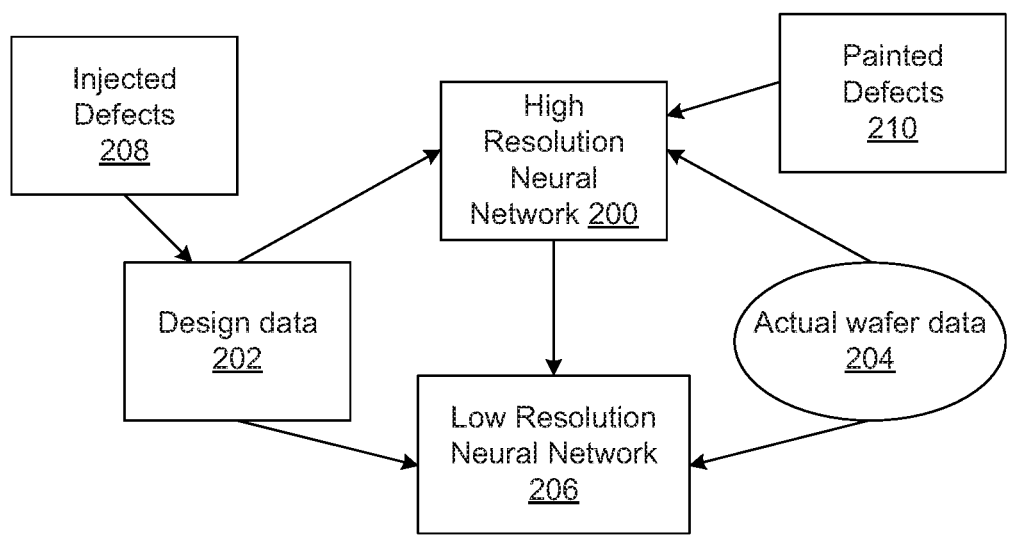
FIG. 2 is a flow chart illustrating steps that ay be performed by e embodiments described herein.

In another embodiment, the training set of defects includes one or more images of one or more synthetic defects, and the one or more computer subsystems are configured for generating the one or more synthetic defects by altering a design for the specimen to create the one or more synthetic defects in the design, generating simulated high resolution images for the one or more synthetic defects based on the one or more synthetic defects in the design, and adding the simulated high resolution images to the training set. Generating the synthetic defect(s) by altering the design for the specimen may be further performed as described herein. As shown in FIG. 2, the one or more synthetic defects may include "injected" defects 208, which may be determined in any suitable manner. Information for the injected defects 208 may be used to alter design data 202, which may be CAD data or any other suitable type of design data described herein. The altered design data may then be used to generate simulated high resolution images for the injected defects, which may then be input to high resolution neural network 200 as part of the training set. The training set may then be used to train the high resolution neural network as described further herein.

Generating the simulated high resolution images may include simulating what the altered design would look like when printed on a specimen. For example, generating the simulated high resolution images may include generating a simulated representation of a specimen on which the synthetic defect(s) would be printed. One example of an empirically trained process model that may be used to generate a simulated specimen includes SEMulator 3D, which is commercially available from Coventor, Inc., Cary, N.C. An example of a rigorous lithography simulation model is Prolith, which is commercially available from KLA-Tencor, and which can be used in concert with the SEMulator 3D product. However, the simulated specimen may be generated using any suitable model(s) of any of the process(es) involved in producing actual specimens from the design data. In this manner, the altered design (altered to include one or more synthetic defects) may be used to simulate what a specimen on which the altered design has been formed will look like in specimen space (not necessarily what such a specimen would look like to an imaging system). Therefore, the simulated representation of the specimen may represent what the specimen would look like in 2D or 3D space of the specimen.

The simulated representation of the specimen may then be used to generate the simulated high resolution images that illustrate how the specimen on which the synthetic defects are printed would appear in one or more actual images of the specimen generated by the high resolution imaging subsystem. The simulated high resolution images may be produced using a model such as WINsim, which is commercially available from KLA, and which can rigorously model the response of an inspector using an electromagnetic (EM) wave solver. Such simulations may be performed using any other suitable software, algorithm(s), method(s), or system(s) known in the art.

In one such embodiment, the one or more computer subsystems are configured for generating the simulated high resolution images using the high resolution neural network, and the high resolution neural network is configured as a deep generative model. For example, the computer subsystem(s) may use a deep generative model combined with a synthetic method of generating defects on design (EDA/CAD) data to produce realistic systematic and random defects on high resolution images to inject into the training set for use by any machine learning algorithm including but not limited to DL systems.

A "generative" model can be generally defined as a model that is probabilistic in nature. In other words, a "generative"

model is not one that performs forward simulation or rule-based approaches and, as such, a model of the physics of the processes involved in generating an actual image or output (for which a simulated image is being generated) is not necessary. Instead, as described further herein, the generative model can be learned (in that its parameters can be learned) based on a suitable training set of data. The generative model may be configured to have a DL architecture, which may include multiple layers that perform a number of algorithms or transformations. The number of layers included in the generative model may be use case dependent. For practical purposes, a suitable range of layers is from 2 layers to a few tens of layers. Deep generative models that learn the joint probability distribution (mean and variance) between the high resolution images (image of actual wafer) and design (e.g., CAD or a vector representation of intended layout) can be used to generate the simulated high resolution images that are included in the training set. Defect artifacts such as opens, shorts, protrusions, intrusions, etc. could be inserted into the CAD and then fed into a generative model trained by a network as described in U.S. Patent Application Publication No. 2017/0148226 published May 25, 2017 by Zhang et al., and "Semi-supervised Learning with Deep Generative Models," Kingma et al., NIPS 2014, Oct. 31, 2014, pp. 1-9, which are incorporated by reference as if fully set forth herein, to create realistic defects. The embodiments described herein may be further configured as described in these references.

In an additional embodiment, the training set of defects includes one or more images of one or more synthetic defects, the one or more computer subsystems are configured for generating the one or more images of the one or more synthetic defects by altering a design for the specimen to create the one or more synthetic defects in the design, and the one or more computer subsystems are configured for generating simulated low resolution images for the one or more synthetic defects based on the one or more synthetic defects in the design. In this manner, the simulated low resolution images illustrate how the defects (e.g., known DOIs) appear in one or more actual images generated by the low resolution imaging subsystem. As such, the simulated image(s) may represent (e.g., correspond, simulate, or approximate) images that may be generated of the defects by the low resolution imaging subsystem.

Generating the one or more synthetic defects by altering a design for the specimen may be performed as described further herein. If design (CAD) is available, it is straightforward to inject legal defect examples. For example, DOIs such as opens, shorts, "mouse bites," protrusions, etc. can be rendered (drawn) with various sizes, which could be automated based on descriptions of the DOIs. Using an EDA tool, these rendered DOIs can be located in "legal" places in the geometry instead of in random places. In one example, a short is a metal connection between two copper lines. For such a DOI, one could simply add a small short line at strategic pinch points in the design. Process patterning defects can also be drawn in the segmentation mode. Segmentation mode generally refers to a stage of the inspection in which images generated by the inspection tool are segmented with or without user input or design information. Process patterning defects refers to material that can be added, lifted, pinched off, etc. and usually happen in a manner that is somewhat independent of the geometry or design patterns formed on the specimen (although the geometry or design patterns may in actuality contribute to the formation of such defects). One or more examples of such process patterning defects can be hand drawn by a user in the segmented images and then injected into the neural networks described herein in that way during training.

In one such example shown in FIG. 2, the one or more synthetic defects may include "injected" defects 208, which may be determined as described herein. Information for the injected defects 208 may be used to alter design data 202, which may be CAD data or any other suitable type of design data described herein. The altered design data may then be used to generate simulated low resolution images for the injected defects, which may then be input to low resolution neural network 206 for training, which may be performed as described further herein.

In one such embodiment, the one or more computer subsystems are configured for generating the simulated low resolution images using a deep generative model. For example, the computer subsystem(s) may use a deep generative model combined with a synthetic method of generating defects on design (EDA/CAD) data to produce realistic systematic and random defects on low resolution images to inject into the training set for the use by any machine learning algorithm including but not limited to DL systems. The deep generative model may be configured as described herein.

In another such embodiment, generating the simulated low resolution images is performed with a generative adversarial network or a variational Bayesian method. For example, to leverage the design at it fullest, a rendering trick of GAN or variational Bayes may be used to create realistic looking low resolution images for training. The GAN or variational Bayesian method may be configured and/or performed as described further herein.

In a further embodiment, the training set of defect images includes one or more synthetic defects, and the one or more computer subsystems are configured for generating the one or more synthetic defects by altering one or more of the images generated by the high resolution imaging subsystem and one or more of the images generated by the low resolution imaging subsystem to create a segmentation image, altering the one or more of the images generated by the high resolution imaging subsystem based on the segmentation image, and generating simulated low resolution images for the one or more synthetic defects based on the altered one or more images. For example, when design (CAD) is not available, the high resolution images and low resolution images may be leveraged to create as perfect a segmentation (binary) image as possible. There are numerous representation networks that can be used to perform this segmentation. In particular, a high resolution image will generally have less noise than a low resolution image. So a segmentation algorithm can be used a priori to create effectively something that looks like the design (or it will at least be cleaner in the high resolution image than the low resolution image) and then can be transferred to the low resolution image (either with a simple geometric operation or a more complex neural network image-to-image translation) thereby producing a relatively good "pseudo CAD" for the image. Once we have this segmentation image, defects can be injected (drawn manually or automatically) and then simulated low resolution images can be rendered for the injected defects and used for training. The image-to-image translation may be performed as described in U.S. Patent Application Publication No. 2017/0200265 published Jul. 13, 2017 by Bhaskar et al., which is incorporated by reference as if fully set forth herein. The embodiments described herein may be further configured as described in this publication. Image segmentation and image-to-image translation may also be performed in this embodiment as described in "image-to-Image Translation with Conditional Adversarial Networks," by Isola et al., arXiv:1611.07004v2, Nov. 22, 2017, 17 pages, which is incorporated by reference as if fully set forth herein. The embodiments described herein may be further configured as described in this publication.

In one such embodiment, generating the simulated low resolution images is performed with a generative adversarial network or a variational Bayesian method. For example, the computer subsystem(s) may use a CAN or variational network to re-create low resolution images of the injected defects that are then used for training. The CAN or variational method may be configured and used as described further herein.

In some embodiments, the one or more computer subsystems are configured for generating the at least one of the defect images synthetically by altering the at least one of the images generated by the high resolution imaging subsystem for the specimen to create high resolution images for known DOIs. For example, for the known DOIs, the act of "painting" examples in a legal structure of the design rule can be used to enable a DL network to quite easily detect defects. In one such example, as shown in FIG. 2, the at least one of the defect images may include "painted" defects 210. Based on information for the known DOIs, which may be acquired as described herein, information for how the known DOIs would appear in the high resolution images may be generated. Information for painted defects 210 may be used to alter high resolution images to create the high resolution images for the painted defects. In one particular example, based on information for a bridge defect, one or more high resolution images can be altered to show such a bridge between two patterned structures. The information for the bridge defect may include information such as how the defect type tends to appear in high resolution images and expected characteristics for the bridge defect such as the dimensions, materials, shape, texture, and the like that may have some effect on the high resolution images. The altered high resolution images may be input to high resolution neural network 200 as part of the training set and then used to train the high resolution neural network as described further herein.

In another embodiment, the training set of defect images includes one or more images of one or more artificial defects on the specimen generated by performing a process on the specimen known to cause the one or more artificial defects on the specimen. For example, as shown in FIG. 2, actual wafer data 204 may include defects that have been detected on one or more wafers (e.g., defective test wafers) and that have preferably (but not necessarily) been verified and/or classified as DOI using a ground truth method (e.g., using a SEM defect review method, user verification or classification performed manually, etc.). Information for the detected defects may be input to high resolution neural network 200 as part of the training set and then used to train the high resolution neural network as described further herein.

In some such embodiments, the user can provide a defective test wafer that has examples of opens/shorts, and other types of DOIs. A process window qualification (PWQ) type DOI wafer can also be used as a defective test wafer to generate information for known DOIs that can be used to train the model so that real world examples of defects are made explicit by the user. An extreme process condition can be deliberately induced so that examples of such defects are produced and detected on the test specimen. The PWQ equivalent of RDL layers can be exploited.

The process known to cause the artificial defect(s) on the specimen may be performed with two or more different values of one or more parameters of the process. Such a process may be performed using a PWQ method. For example, designs of experiments (DOEs) such as PWQ may be used as a generator of systematic defects. In general, PWQ is a technique invented by KLA in the early 2000s for lithography focus and exposure process window characterization and is widely adopted in one form or another. The basis for PWQ is to create an inspector compatible wafer where there are nominal dice and modulated dice next to each other in a systematic fashion to maximize signal for the inspector. The one or more parameters of the process that are varied in the PWQ method may include focus and exposure (e.g., as in a focus-exposure PWQ process). PWQ methods may also be performed as described in U.S. Pat. No. 6,902,855 to Peterson et al. issued on Jun. 7, 2005, U.S. Pat. No. 7,418,124 to Peterson et al. issued on Aug. 26, 2008, U.S. Pat. No. 7,729,529 to Wu et al. issued on Jun. 1, 2010, U.S. Pat. No. 7,769,225 to Kekare et al. issued on Aug. 3, 2010, U.S. Pat. No. 8,041,106 to Pak et al. issued on Oct. 18, 2011, U.S. Pat. No. 8,111,900 to Wu et al. issued on Feb. 7, 2012, and U.S. Pat. No. 8,213,704 to Peterson et al. issued on Jul. 3, 2012, which are incorporated by reference as if fully set forth herein. The embodiments described herein may include any step(s) of any method(s) described in these patents and may be further configured as described in these patents. A PWQ wafer may be printed as described in these patents.

Such a process may also be performed using a focus exposure matrix (FEM) method. For example, DOEs such as FEM methods and/or wafers may be used as a generator of systematic defects. FEM methods generally involve printing a number of dies on a wafer at different combinations of focus and exposure parameter values of a lithography process. The different dies can then be inspected in any suitable manner to detect defects in the different dies. That information is then typically used to determine a process window for the focus and exposure of the lithography process. Therefore, a FEM method may be used to print such dies on a specimen, an e defects detected on such a specimen may be used to identify known DOIs.

As described above, therefore, one or more DOEs such as PWQ and FEM wafers may be used as generators of systematic defects. In this manner, the high resolution neural network may be trained using information generated from a PWQ or FEM wafer that can act as a generator of systematic defects, while PWQ and their "cousin" FEM wafers are primarily used for determining process margin today, they can be repurposed for training the neural networks described herein with real defects since they will occur in abundance on these wafers. These wafers and the information generated from them can then be used as training samples for the training described further herein. If such samples do not provide a complete set of possible defects, the information generated from such wafers may be complemented with other information such as that generated by synthetic defect generation, which may be performed in a number of different manners as described further herein.

Performing a process on the specimen known to cause the artificial defect(s) on the specimen may be advantageous when not all defect types can be created using the design such as bottom bridges and metal residue. Such defects can be induced by process out of window (where the process is performed using one or more parameters that are known to be outside of the process window for the process). The reticle may have RDL Comb/Meander Rs of different width.

Different concentrations of metal glue layer removal can be experimented with to produce these types of defects. The locations of these process defects can be determined by measuring the chain resistance as infinite or zero indicates an open or short then imaged for use in creating an optimal DL network.

In an additional embodiment, the training set of defect images includes one or more defects detected on the specimen in one or more of the images generated by the high resolution imaging subsystem. For example, as shown in FIG. 2, actual wafer data 204 may include defects that have been detected on one or more wafers (e.g., defective test wafers) and that have preferably (but not necessarily) been verified and/or classified as DOIs using a ground truth method (e.g., using a SEM defect review method, user verification or classification performed manually, etc.). Information for the detected defects may be input to high resolution neural network 200 as part of the training set. The training set may then be used to train the high resolution neural network as described further herein.

In one such embodiment, the one or more computer subsystems are configured for detecting the defects on the specimen in the images generated by the high resolution imaging subsystem by single image detection (SID). For example, the high resolution imaging subsystem may be trained by a version of the SID algorithm. SID may be performed by the embodiments described herein as described in U.S. Patent Application Publication No. 2017/0140524 published May 18, 2017 by Karsenti et al., which is incorporated by reference as if fully set forth herein. The embodiments described herein may be further configured as described in this publication.

In another such embodiment, the one or more computer subsystems are configured for detecting the defects on the specimen in the images generated by the high resolution imaging subsystem by die-to-database detection. For example, the computer subsystem(s) may leverage a machine learning algorithm or any die-to-database inspection algorithm as a ground truth trainer. Die-to-database detection may be performed by comparing the high resolution images to a reference such as design data for the specimen. The results of such comparing may therefore be difference images (as the reference may be subtracted from the high resolution test images). The difference images may then be used to identify possible defects in the difference images by applying a threshold to the difference images).

The training set of defect images that are used for training as described herein may therefore come from a couple of different sources including actual defects that just happen to be detected on an actual specimen or programmed, synthetic, and artificial defects that are intentionally caused on the specimen or in images rendered for the specimen. The training set of defect images can also include some combination of actual defects and programmed, synthetic, and/or artificial defects.

Using the programmed, synthetic, or artificial defects (possibly in combination with actual defects) may be advantageous for a couple of reasons. As described further herein, one of the applications that the embodiments described herein have been created and are particularly advantageous for is RDL. Although fine pitch RDL occupies a relatively small area of chip layouts, they are a known source of yield loss due to dense RDL, patterns. To achieve high yield, inline defect inspection is deployed during formation of the RDL lines. Complicating matters is that killer defects for RDL formation are few and far between in the actual production environment. However, 100% capture rate of key killer defects is usually required in these fine pitch RDL inspections. Many iterations of inspection recipe modifications may have to be done to accommodate all killer defect types. Hence, a production worthy inspection recipe can take weeks or months to fine tune due to scarcity of small actual killer defect samples.

The challenge here is to optimize modes in the discovery phase with the shortest cycle time and the least iterations. For example, if substantially small RDL, shorts of about 1 micron do not appear in the first 50 actual product wafers, the application engineer has to wait until the 51st wafer for his optimize inspection recipe process to complete and achieve 100% capture rate. The embodiments described herein, however, provide a systematic approach to generating systematic repeating critical size (e.g., 0.5 microns, 1.0 microns, and 2.0 microns) defects in fixed locations on a lithography mask. Lithography based killer defect types like RDL metal shorts and RDL, metal opens can be reproduced in a systematic way by violating the mask pattern either by creating opaque or pin dot defects on the mask. A 3D optical lithography simulation tool can be employed to predict the printability of various reticle defect scenarios. Experimental data can be used to validate the 3D simulator by comparing modeling data to SEM measurements of wafers exposed with a reticle containing programmed clear pinhole and opaque pin dot defects.

The programmed, artificial, and synthetic defects used for the training described herein can also be designed in such a way that both the manufactured lithography defects and wet etch induced process defects can cause electrical failure. Meander or comb structures can be designed with daisy chain structures to measure chain resistance as a proxy for RDL shorts or breaks. Several new benefits are provided by this approach. For example, this technique can be used to build a calibration wafer with systematic lithography and wet etch process defects. In addition, the manufactured defects can be matched to electrical failures by mapping the physical defects detected by an inspection tool to real electrical failure data. The results of such mapping can be used to calibrate or alter the inspection process if the inspection process either over-detects or under-detects killer defects with their corresponding electrical failure sites. The embodiments also provide a robust way to bring a newly installed RDL inspector to its full integration capability entitlement with such an approach within a short period of time instead of weeks or months after installation as the full layer RDL stack represents each user process condition and margin for defect creation. Furthermore, the same systematic approach can be used for different RDL applications even if those RDL processes have a huge variety of lithography processing approaches (e.g., mask aligners, projection steppers, laser direct imaging, and laser ablation). The embodiments described herein can also cater to prior layer RDL noise that can be a major detection challenge for multiple RDL layers and build these into the specimens on which programmed and/or artificial, defects are formed or for which the programmed and/or artificial defects are generated. In addition, design data for a specimen on which programmed and/or artificial are formed may be created or altered so that the systematic defects can be correlated with electrical test structures.

The one or more computer subsystems are further configured for training the low resolution neural network using the training set of defect images as input. In this manner, the DL based macro inspector can use the high resolution imaging subsystem as a de-facto inspector to train a low resolution macro tool. The training of the low resolution neural network may be performed using one of the transfer learning techniques described further herein, by using the high resolution neural network as a mother network.

In addition or alternatively, the known DOIs and their locations in the high resolution images may be used to identify locations of the known DOIs in the low resolution images. For example, as described further herein, the computer subsystem(s) may be configured for generating high resolution images from low resolution images (or vice versa) using an image-to-image translation technique described herein. Therefore, high and low resolution images that correspond to each other (as being generated at, the same location on the specimen) can be identified. In this way, at least one of the defect images in the training set may be generated synthetically by the high resolution neural network using at least one of the images generated by the high resolution imaging subsystem. The locations of the known DOIs in the high resolution images can then be used to identify the locations of the known DOIs in the low resolution images (e.g., by image coordinate translation or by overlaying corresponding images). The high resolution images generated at the locations of the known DOIs can then be used (with or without using the trained high resolution neural network for transfer learning) to train the low resolution neural network. Such training may be performed as described herein with respect to training the high resolution neural network.

In one embodiment, the training set of defect images includes images of the specimen generated by more than one mode of the low resolution imaging subsystem. In one such embodiment, the more than one mode of the low resolution imaging subsystem includes all of the modes of the low resolution imaging subsystem. For example, the low resolution images used for training the low resolution neural network may be generated for 30+ modes (or all of the modes of the low resolution imaging subsystem). The modes of the images used for training the low resolution neural network may include images that were actually generated using the low resolution imaging subsystem (e.g., by imaging an actual specimen using the modes of the low resolution imaging subsystem). In addition, or alternatively, images for some (one or more) or all of the modes of the low resolution imaging subsystem used for training the low resolution neural network may be generated by simulation or image-to-image translation, both of which may be performed as described herein. In this manner, the images that are used for training the low resolution neural network may include images for all of the modes generated using the low resolution imaging subsystem, images for all of the modes generated without using the low resolution imaging subsystem, or some combination thereof.

The neural networks described herein may also include networks that require minimal training samples. Examples of training neural networks with a limited training set are described in U.S. Patent Application Publication No. 2017/0193400 published Jul. 6, 2017 by Bhaskar et al., which is incorporated by reference as if fully set forth herein. The embodiments described herein may be further configured as described in this publication. The training that is performed herein may also include active learning schemes (ALS) such as those described in U.S. Patent Application Ser. No. 62/681,073 filed Jun. 5, 2018 by Zhang et al., which is incorporated by reference as if fully set forth herein. The embodiments described herein may be further configured as described in this patent application.

In another such embodiment, the one or more computer subsystems are configured for selecting one or more of the more than one mode of the low resolution imaging subsystem used for detecting defects on another specimen (or other specimens) based on results of training the low resolution neural network with the images generated by the more than one mode of the low resolution imaging subsystem. For example, when combined with the nuisance suppression technique described above, the multiple modes of the low resolution images used for training enable determining which one or more (e.g., 3) diverse modes of the low resolution imaging subsystem are capable of catching all DOIs and suppressing nuisances. In one such example, one or more of the modes that provide the best combined performance for DOI detection and nuisance suppression may be selected for use in inspection of other specimens. In another such example, one or more of the modes that in combination provide the best combined performance (where one mode may compensate for another mode and/or images generated using more than one mode are used in combination) for DOI detection and nuisance suppression may be selected for inspection of other specimens. The one or more modes may be diverse in one or more parameters of the optical modes (e.g., different wavelengths, different polarizations, different pixel sizes (magnifications), etc.). These triodes are then used to scan the entire wafer and then the trained low resolution neural network uses images generated by scanning the wafer with these modes to detect DOIs. In this manner, the DL based macro inspector embodiments described herein can exploit the entire mode space of the inspector (e.g., wavelengths, apertures, BF vs. DF, etc.).

The one or more computer subsystems are also configured for detecting defects on another specimen by inputting the images generated for the other specimen by the low resolution imaging subsystem into the trained low resolution neural network. In this manner, once the low resolution neural network has been trained, images generated by the low resolution imaging subsystem for other specimens (possibly with the one or modes of the low resolution imaging subsystem selected as described herein) may be input to the low resolution neural network by the computer subsystem(s), and the low resolution neural network may detect defects in the input images and generate information for the detected defects, which may include any suitable output that can be generated by the low resolution neural network for the detected defects.

In one embodiment, the high and low resolution neural networks are configured for single image defect detection. For example, a die-to-die algorithm may not be invoked by the systems described herein for defect detection. Instead, the computer subsystem(s) may use SID for defect detection. Using such defect detection eliminates any misalignment issues from affecting the defect detection results. SID may be performed as described further herein.

In one embodiment, the inspection tool is configured as a macro inspection tool. A macro inspection tool is suitable for inspection of relatively noisy BEOL layers such as RDL and post-dice applications to detect defects in the presence of enormous noise such as grain on metal lines. A macro inspection tool is defined herein as a system that is not necessarily diffraction limited and has a spatial resolution of about 200 nm to about 2.0 microns and above. Such spatial resolution means that the smallest defects that such systems can detect have dimensions of greater than about 200 nm, which is much larger than the smallest defects that the most advanced inspection tools on the market today can detect, hence the "macro" inspector designation. Such systems tend to utilize longer wavelengths of light (e.g., about 500 nm to about 700 nm) compared to the most advanced inspection tools on the market today. These systems may be used when the DOIs have relatively large sizes and possibly also when throughputs of 100 wafers per hour (wph) or more are required (wafer throughput here refers to number of 300 mm wafers inspected per hour).

The embodiments described herein provide a novel DL based macro inspector that suppresses nuisances in RDL and grainy (high noise) layers by co-optimizing the mode space as well as the algorithm detection space. For example, in some embodiments, the defects detected on the other specimen are defects of a BEOL layer of the other specimen. The BEOL layer may include any BEOL layer known in the art including those described herein. In a further embodiment, the defects detected on the other specimen are defects of a RDL layer of the other specimen. The RDL layer may have any suitable configuration known in the art.

In another embodiment, the defects detected on the other specimen are defects of a high noise layer of the other specimen. A "high noise" layer as that term is defined herein generally refers to a layer whose noise is the predominant obstacle in inspection of the layer. For example, while every wafer layer that is inspected by any inspection tool may exhibit more or less noise than other layers (and techniques for handling detection of such noise must in general be used in the inspection of every wafer layer), the primary obstacle in inspecting wafer layers successfully is most often the extremely small size of the defects that must be detected. In contrast, the embodiments described herein are particularly suitable for detecting relatively large ("macro" defects of about 200 nm and above in size). Therefore, the primary obstacle in such inspection is not necessarily the size of the defects that must be detected (as many inspection tool configurations are capable of detecting such large defects on most layers). Instead, the layers described herein will in general exhibit such "high noise" levels in images generated for the layers that detecting defects of even such large sizes can be rendered difficult if not impossible. However, the embodiments described herein have been designed to handle such noise levels via the training (and optional mode selection) described herein that detecting defects on such high noise layers is rendered possible.

In an additional embodiment, the defects detected on the other specimen are defects of a layer that includes metal lines of the other specimen. For example, the BEOL and RDL layers described herein may include metal lines that form various elements of the devices being formed on the specimen. Such metal lines may produce a significant amount of "grain" noise, which is described further herein. However, the embodiments described herein are configured for enabling detection of defects on such layers despite the grain noise due to the various training methods described herein.

In some embodiments, the other specimen on which the defects are detected is a post-dice specimen. A "post-dice" specimen can be generally defined as a wafer or other substrate on which multiple devices have been formed (e.g., in different dies or dice) and then separated from each other in one of various ways. A "post-dice" specimen may also be a specimen that has been separated into multiple dies or dice, which have not yet entered the packaging process.

The defects that are detected on such layers and specimens may include, for example, RDL metal line defects (shorts/bridges, opens/broken lines, metal residues/bottom bridges), via/contact defects (photoresist residues/via scumming), bump defects, micro-bump defects, copper pillar defects, after-stacking-of-chips defects, after chemical-mechanical processing (CMP) defects, and after-grinding defects. Therefore, the embodiments described herein can be used to monitor (and possibly correct) any of the processes that were performed on the specimen and resulted in such defects.

The embodiments described herein were designed to be particularly effective for detecting such defects for a number of different reasons. For example, such defects tend to be relatively difficult to detect because they tend to be located in a substantially noisy (e.g., grainy) background. In one such example, substantial noise can be detected by inspection due to within RDL metal line noise, which may be caused by excessive metal grain. In another such example, substantial noise can be detected by inspection due to inter-RDL metal layer noise caused by transparent dielectric polymer on or under the RDL layer. As such, the ratio of false events versus the real killer DOI that are reported by previously used inspection systems and methods can be substantially high. However, by training the low resolution neural network as described herein, which can be performed with a relatively high number of known DOIs by the embodiments described herein, the trained low resolution neural network can be used for detecting such DOI without detecting a huge amount of nuisances. In addition, using the SID method described herein for detecting such defects will reduce the die-to-die defect detection source of noise.

High-performance computing (HPC) applications such as AI networking chips and field programmable gate arrays (FPGAs) are increasingly being utilized, and advanced multi-chip packaging to integrate different functions may be a fast time-to-market and cost effective solution instead of silicon on chip (SOC). Accordingly, much denser die-to-die communication input/output (I/Os) for advanced packaging are needed. To fulfill this demand, relatively large numbers of registered routing lines between dies lead to a constant drive for miniaturization for die-to-die RDL among industry participants. To meet the future demand, RDL line width with 2 um/2 um line/space is about to go into volume production and active development is commencing with RDL line width down to a submicron range (less than about 1 micron). Typically, die size of HPC chips are substantially large and notoriously low yield. Key yield loss areas are where fine pitch RDL lines are placed. For example, today's fan out packages range from 5 um line and space (5-5 um) and above with 2-2 um in the works. In research and development, some are working on high end fan-out technologies at 1-1 um and below, including packages capable of supporting high-bandwidth memory (HMI). Targeted for networking/server applications, fan-out at 2-2 um may appear soon with 1-1 um slated for around 2020. The embodiments described herein advantageously provide systems and methods for effective and efficient defect detection in such devices thereby overcoming a significant obstacle in the successful production of such devices.

The embodiments described herein have, therefore, a number of advantages over other methods and systems for detecting defects on the specimens described herein, some of which are described above. In addition, the steps described herein can reduce the two weeks of data gathering currently needed to setup inspection recipes for the specimens described herein into eight hours of data gathering followed by about 1 to 2 hours of offlink processing. At this phase, a network is trained that can run the whole wafer. In addition, the training described herein requires minimal user intervention. For example, a user may classify a maximum of 100 events or paint a maximum of 100 defects. The network will be hyper-tuned to catch the core defects and suppress the real noise. When real DOI are detected by this network, they can be weighted more heavily than the artificial defects described herein and used to fine tune the low resolution neural network for both DOI detection and nuisance rate suppression. Such fine-tuning may be performed in an active learning method or scheme, which may be performed as described further herein.

The embodiments described herein may be further configured as described in commonly owned U.S. Patent Application Publication Nos. 2017/0140524 published May 18, 2017 by Karsenti et al., 2017/0148226 published May 25, 2017 by Zhang et al., 2017/0193400 published Jul. 6, 2017 by Bhaskar et al., 2017/0193680 published Jul. 6, 2017 by Zhang et al., 2017/0194126 published Jul. 6, 2017 by Bhaskar et al., 2017/0200260 published Jul. 13, 2017 by Bhaskar et al., 2017/0200264 published Jul. 13, 2017 by Park et al., 2017/0200265 published Jul. 13, 2017 by Bhaskar et al., 2017/0345140 published Nov. 30, 2017 by Zhang et al. 2019/0073566 published Mar. 7, 2019 by Brauer, and 2019/0073568 published Mar. 7, 2019 by He et al., which are incorporated by reference as if fully set forth herein. The embodiments described herein may be further configured as described in these publications. In addition, the embodiments described herein may be configured to perform any steps described in these publications.

All of the embodiments described herein may include storing results of one or more steps of the embodiments in a computer-readable storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. to perform one or more functions for the specimen or another specimen. Such functions include, but are not limited to, altering a process such as a fabrication process or step that was or will be performed on the specimen on which defects were detected in a feedback or feedforward manner, etc.

Each of the embodiments of each of the systems described above may be combined together into one single embodiment.

Another embodiment relates to a computer-implemented method for training a neural network for defect detection in low resolution images. The method includes generating images for a specimen with high and low resolution imaging subsystems of an inspection tool. The imaging subsystems and the inspection tool are configured as described further herein. One or more components are executed by one or more computer systems, and the one or more components include a high resolution neural network and a low resolution neural network. The one or more components, the one or more computer systems, and the high and low resolution neural networks are configured as described further herein. The method includes generating the training set of defect images, training the low resolution neural network, and detecting defects steps described further herein. These steps are performed by the one or more computer systems.

Each of the steps of the method may be performed as described further herein. The method may also include any other step(s) that can be performed by the system, computer system(s), and/or neural networks described herein. The computer system(s) may be configured according to any of the embodiments described herein, e.g., computer system(s) 102. In addition, the method described above may be performed by any of the system embodiments described herein.

Figure 3:
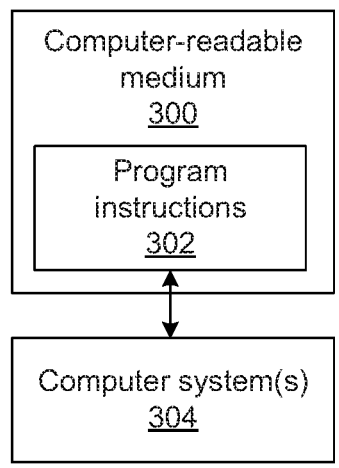
FIG. 3 is a block diagram illustrating one embodiment of a non-transitory computer-readable medium storing program instructions for causing computer system(s) to perform a computer-implemented method described herein.

An additional embodiment relates to a non-transitory computer-readable medium storing program instructions executable on one or more computer systems for performing a computer-implemented method for training a neural network for defect detection in low resolution images. One such embodiment is shown in FIG. 3. In particular, as shown in FIG. 3, non-transitory computer-readable medium 300 includes program instructions 302 executable on computer system(s) 304. The computer-implemented method may include any step(s) of any method(s) described herein.

Program instructions 302 implementing methods such as those described herein may be stored on computer-readable medium 300. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system(s) 304 may be configured according to any of the embodiments described herein.

Further modifications and alternative embodiments of various aspects of the invention will be apparent to those skilled in the art in view of this description. For example, methods and systems for training a neural network for defect detection in low resolution images are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to train a neural network for defect detection in low resolution images, comprising:
   an inspection tool comprising a high resolution imaging subsystem and a low resolution imaging subsystem, wherein the high and low resolution imaging subsystems comprise at least an energy source and a detector, wherein the energy source is configured to generate energy that is directed to a specimen, and wherein the detector is configured to detect energy from the specimen and to generate images responsive to the detected energy;
   one or more computer subsystems configured for acquiring the images of the specimen generated by the high and low resolution imaging subsystems; and
   one or more components executed by the one or more computer subsystems, wherein the one or more components comprise a high resolution neural network and a low resolution neural network; and wherein the one or more computer subsystems are further configured for:

generating a training set of defect images, wherein at least one of the defect images is generated synthetically by the high resolution neural network using at least one of the images generated by the high resolution imaging subsystem;

training the low resolution neural network using the training set of defect images as input; and detecting defects on another specimen by inputting the images generated for the other specimen by the low resolution imaging subsystem into the trained low resolution neural network.

2. The system of claim 1, wherein the training set of defect images comprises images of the specimen generated by more than one mode of the low resolution imaging subsystem.

3. The system of claim 2, wherein the more than one mode of the low resolution imaging subsystem comprises all of the modes of the low resolution imaging subsystem.

4. The system of claim 2, wherein the one or more computer subsystems are further configured for selecting one or more of the more than one mode of the low resolution imaging subsystem used for detecting the defects on the other specimen based on results of training the low resolution neural network with the images generated by the more than one mode of the low resolution imaging subsystem.

5. The system of claim 1, wherein the inspection t configured as a macro inspection tool.

6. The system of claim 1, wherein the defects detected on the other specimen are defects of a back end layer of the other specimen.

7. The system of claim 1, wherein the defects detected on the other specimen are defects of a redistribution layer of the other specimen.

8. The system of claim 1, wherein the defects detected on the other specimen are defects of a high noise layer of the other specimen.

9. The system of claim 1, wherein the defects detected on the other specimen are defects of a layer comprising metal lines of the other specimen.

10. The system of claim 1, wherein the other specimen on which the defects are detected is a post-dice specimen.

11. The system of claim 1, wherein the high and low resolution neural networks are configured for single image defect detection.

12. The system of claim 1, wherein the training set of defect images comprises one or more images of one or more programmed defects on the specimen, wherein the one or more computer subsystems are further configured for generating the one or more programmed defects by altering a design for the specimen to create the one or more programmed defects in the design, and wherein the altered design is printed on the specimen to create the one or more programmed defects on the specimen.

13. The system of claim 1, wherein the training set of defects comprises one or more images of one or more synthetic defects, and wherein the one or more computer subsystems are further configured for generating the one or more synthetic defects by altering a design for the specimen to create the one or more synthetic defects in the design, generating simulated high resolution images for the one or more synthetic defects based on the one or more synthetic defects in the design, and adding the simulated high resolution images to the training set.

14. The system of claim 13, wherein the one or more computer subsystems are further configured for generating the simulated high resolution images using the high resolution neural network, and wherein the high resolution neural network is configured as a deep generative model.

15. The system of claim 1, wherein the training set of defects comprises one or more images of one or more synthetic defects, wherein the one or more computer subsystems are further configured for generating the one or more images of the one or more synthetic defects by altering a design for the specimen to create the one or more synthetic defects in the design, and wherein the one or more computer subsystems are further configured for generating simulated low resolution images for the one or more synthetic defects based on the one or more synthetic defects in the design.

16. The system of claim 15, wherein the one or more computer subsystems are further configured for generating the simulated low resolution images using a deep generative model.

17. The system of claim 15, wherein generating the simulated low resolution images is performed with a generative adversarial network or a variational Bayesian method.

18. The system of claim 1, wherein the training set of defects comprises one or more synthetic defects, and wherein the one or more computer subsystems are further configured for generating the one or more synthetic defects by altering one or more of the images generated by the high resolution imaging subsystem and one or more of the images generated by the low resolution imaging subsystem to create a segmentation image, altering the one or more of the images generated by the high resolution imaging subsystem based on the segmentation image, and generating simulated low resolution images for the one or more synthetic defects based on the altered one or more images.

19. The system of claim 18, wherein generating the simulated low resolution images is performed with a generative adversarial network or a variational Bayesian method.

20. The system of claim 1, wherein the one or more computer subsystems are further configured for generating the at least one of the defect images synthetically by altering the at least one of the images generated by the high resolution imaging subsystem for the specimen to create high resolution images for known defects of interest.

21. The system of claim 1, wherein the training set of defect images comprises one or more images of one or more artificial defects on the specimen generated by performing a process on the specimen known to cause the one or more artificial defects on the specimen.

22. The system of claim 1, wherein the training set of defect images comprises one or more defects detected on the specimen in one or more of the images generated by the high resolution imaging subsystem.

23. The system of claim 22, wherein the one or more computer subsystems are further configured for detecting the defects on the specimen in the images generated by the high resolution imaging subsystem by single image detection.

24. The system of claim 22, wherein the one or more computer subsystems are further configured for detecting the defects on the specimen in the images generated by the high resolution imaging subsystem by die-to-database detection.

25. The system of claim 1, wherein the inspection tool is configured for scanning swaths on the specimen while detecting energy from the specimen, and wherein the one or more computer subsystems are further configured for acquiring and storing at least three of the swaths of the images generated by the high resolution imaging subsystem such that the at least three of the swaths are available for use in generating the training set of defect images.

26. The system of claim 1, wherein the one or more computer subsystems are further configured for training the high resolution neural network, and wherein training the high resolution neural network and training the low resolution neural network are performed using a generative adversarial network or a variational Bayesian method.

27. The system of claim 1, wherein the high resolution neural network is configured as a semi-supervised deep learning framework.

28. The system of claim 1, wherein the low resolution neural network is configured as a semi-supervised deep learning framework.

29. The system of claim 1, wherein the images generated by the low resolution imaging subsystem and acquired by the one or more computer subsystems comprise images taken through focus, wherein the one or more computer subsystems are further configured for mapping the images taken through focus to the images generated by the high resolution imaging subsystem, and wherein training the low resolution neural network is further performed based on the results of training the high resolution neural network and results of the mapping.

30. A non-transitory computer-readable medium, storing program instructions executable on one or more computer systems for performing a computer-implemented method for training a neural network for defect detection in low resolution images, wherein the computer-implemented method comprises:
   generating images for a specimen with high and low resolution imaging subsystems of an inspection tool, wherein the high and low resolution imaging subsystems comprise at least an energy source and a detector, wherein the energy source is configured to generate energy that is directed to the specimen, and wherein the detector is configured to detect energy from the specimen and to generate images responsive to the detected energy;
   wherein one or more components are executed by the one or more computer systems, and wherein the one or more components comprise a high resolution neural network and a low resolution neural network;
   generating a training set of defect images, wherein at least one of the defect images is generated synthetically by the high resolution neural network using at least one of the images generated by the high resolution imaging subsystem;
   training the low resolution neural network using the training set of defect images as input; and
   detecting defects on another specimen by inputting the images generated for the other specimen by the low resolution imaging subsystem into the trained low resolution neural network, wherein generating the training set, training the low resolution neural network, and detecting the defects are performed by the one or more computer systems.

31. A computer-implemented method for training a neural network for defect detection in low resolution images, comprising:
   generating images for a specimen with high and low resolution imaging subsystems of an inspection tool, wherein the high and low resolution imaging subsystems comprise at least an energy source and a detector, wherein the energy source is configured to generate energy that is directed to the specimen, and wherein the detector is configured to detect energy from the specimen and to generate images responsive to the detected energy;
   wherein one or more components are executed by one or more computer systems, and wherein the one or more components comprise a high resolution neural network and a low resolution neural network;
   generating a training set of defect images, wherein at least one of the defect images is generated synthetically by the high resolution neural network using at least one of the images generated by the high resolution imaging subsystem;
   training the low resolution neural network using the training set of defect images as input; and
   detecting defects on another specimen by inputting the images generated for the other specimen by the low resolution imaging subsystem into the trained low resolution neural network, wherein generating the training set, training the low resolution neural network, and detecting the defects are performed by the one or more computer systems.

* * * * *